(12) United States Patent
Bilicki et al.

(10) Patent No.: US 10,397,366 B2
(45) Date of Patent: Aug. 27, 2019

(54) METHOD AND APPARATUS FOR MANAGING APPLICATION

(71) Applicant: Samsung Electronics Co., Ltd., Suwon-si, Gyeonggi-do (KR)

(72) Inventors: Bartosz Bilicki, Łódź (PL); Dariusz Jędrzejczak, Lipce Reymontowskie (PL); Jae-kwan Won, Hwaseong-si (KR); Jan Wojciechowski, Regnów (PL); Jung-Taek Oh, Seoul (KR); Michał Gierszewski, Łódź (PL); Paweł Tracz, Łódź (PL); Radosław Tarnas, Łódź (PL); Adrian Tkacz, Warsaw (PL); Aleksander Ślusarczyk, Warsaw (PL); Mariusz Zyśk, Warsaw (PL); Tomasz Rzeźniczak, Warsaw (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 232 days.

(21) Appl. No.: 15/273,204

(22) Filed: Sep. 22, 2016

(65) Prior Publication Data

US 2017/0085675 A1  Mar. 23, 2017

Related U.S. Application Data

(60) Provisional application No. 62/222,409, filed on Sep. 23, 2015.

(30) Foreign Application Priority Data

Sep. 12, 2016 (KR) .................. 10-2016-0117367

(51) Int. Cl.
*H04L 29/08* (2006.01)

(52) U.S. Cl.
CPC ............ *H04L 67/325* (2013.01); *H04L 67/36* (2013.01); *G06F 2203/04804* (2013.01)

(58) Field of Classification Search
CPC ....... H04L 67/325; H04L 67/16; H04L 67/36; H04L 41/0879; H04L 41/22; H04L 67/10; H04L 67/42; H04L 41/0803
See application file for complete search history.

(56) References Cited

U.S. PATENT DOCUMENTS

| 5,592,618 A | 1/1997 | Micka et al. |
| 5,960,429 A | 9/1999 | Peercy et al. |

(Continued)

FOREIGN PATENT DOCUMENTS

| WO | 2002-001381 A1 | 1/2002 |
| WO | 2009-087359 A3 | 7/2009 |

OTHER PUBLICATIONS

Marcos Kawazoe Aguilera et al., Heartbeat: A Timeout-Free Failure Detector for Quiescent Reliable Communication, https://www.microsoft.com/en-us/research/wp-content/uploads/1997/09/wdag97_hb.pdf.

(Continued)

*Primary Examiner* — El Hadji M Sall
(74) *Attorney, Agent, or Firm* — Jefferson IP Law, LLP

(57) ABSTRACT

A method of managing a plurality of applications executed on an electronic device is provided. The method includes, based on a first external input regarding at least one application from among the plurality of applications, updating mode of the at least one application from a non-work mode to a work mode, based on the first external input, updating mode of another application other than the at least one application from a work mode to a non-work mode, and displaying a work time regarding the at least one application that is determined based on at least one of information indicating a time point at which the first external input is (Continued)

obtained and information indicating a time point at which the mode of the at least one application is updated from the non-work mode to the work mode.

7 Claims, 12 Drawing Sheets

(56) References Cited

U.S. PATENT DOCUMENTS

| | | | |
|---|---|---|---|
| 6,957,227 | B2 | 10/2005 | Fogel et al. |
| 7,336,187 | B2 | 2/2008 | Hubbard, Jr. et al. |
| 7,930,391 | B1 | 4/2011 | Holt |
| 7,941,849 | B2 | 5/2011 | Ting |
| 8,132,095 | B2 | 3/2012 | Seolas et al. |
| 8,280,369 | B1 * | 10/2012 | Reeves ............... H04L 63/102 455/418 |
| 8,914,494 | B2 | 12/2014 | Bunch |
| 9,015,232 | B2 | 4/2015 | Bimson et al. |
| 2007/0061877 | A1 | 3/2007 | Sima et al. |
| 2008/0120305 | A1 | 5/2008 | Sima et al. |
| 2008/0147851 | A1 | 6/2008 | Le et al. |
| 2009/0174551 | A1 | 7/2009 | Quinn et al. |
| 2009/0204900 | A1 | 8/2009 | Champion et al. |
| 2011/0035486 | A1 | 2/2011 | Seolas et al. |
| 2011/0184910 | A1 | 7/2011 | Love et al. |
| 2013/0187753 | A1 * | 7/2013 | Chiriyankandath .. G06F 3/0488 340/5.51 |
| 2015/0058113 | A1 | 2/2015 | Yi |

OTHER PUBLICATIONS

TimeStats, https://chrome.google.com/webstore/detail/timestats/ejifodhjoeeenihgfpjijjmpomaphmah#detail/timestats/ejifodhjoeeenihgfpjijjmpomaphmah.
Time Tracker, https://chrome.google.com/webstore/detail/time-tracker/mokmnbikneoaenmckfmgjgjimphfojkd#detail/time-tracker/mokmnbikneoaenmckfmgjgjimphfojkd.
Rescue Time, https://www.rescuetime.com/features.
Monitis, http://www.monitis.com/website-monitoring#full-page-load-monitoring.
Session Duration Avg—Analytics Help, https://support.google.com/analytics/answer/1006253.

* cited by examiner

METHOD AND APPARATUS FOR MANAGING APPLICATION

CROSS-REFERENCE TO RELATED APPLICATION(S)

This application claims the benefit under 35 U.S.C. § 119(e) of a U.S. Provisional application filed on Sep. 23, 2015 in the U.S. Patent and Trademark Office and assigned Ser. No. 62/222,409, and under 35 U.S.C. § 119(a) of a Korean patent application filed on Sep. 12, 2016 in the Korean Intellectual Property Office and assigned Serial number 10-2016-0117367, the entire disclosure of each of which is hereby incorporated by reference.

TECHNICAL FIELD

The present disclosure relates to a method of determining a work time of a plurality of applications executed on an electronic device or a work time of a plurality of applications executed on a plurality of electronic devices so that time sections thereof do not overlap, and an electronic device using the method.

BACKGROUND

As the use of remote services, such as remote medical diagnosis, by using web applications has increased, a method of calculating a work time as reference for charging a remote service fee is demanded. However, when tabs and windows of various web browsers are being executed on a single electronic device or a plurality of electronic devices, tabs and windows of a web browser via which a user is actually working are not identified and a work time includes duplicate time sections in a method of calculating a work time of the related art. Thus, a reliable work time cannot be calculated.

Therefore, a method of increasing the reliability of a calculated work time by determining an application that a user is actually using from among a plurality of applications being executed on an electronic device, and calculating a work time of the determined application, is demanded.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of calculating a reliable work time of an application that a user is actually using when a plurality of applications is being executed on a single electronic device or a plurality of electronic devices are being executed on a plurality of electronic devices.

In accordance with an aspect of the present disclosure, a method of managing a plurality of applications executed on an electronic device is provided. The method includes, based on a first external input regarding at least one application from among the plurality of applications, updating mode of the at least one application from a non-work mode to a work mode, based on the first external input, updating mode of another application other than the at least one application from a work mode to a non-work mode, and displaying a work time regarding the at least one application that is determined based on at least one of information indicating a time point at which the first external input is obtained and information indicating a time point at which the mode of the at least one application is updated from the non-work mode to the work mode.

In accordance with another aspect of the present disclosure, an electronic device that executes a plurality of applications, the electronic device is provided. The electronic device includes at least one processor configured to, based on a first external input regarding at least one application from among the plurality of applications, update mode of the at least one application from a non-work mode to a work mode, and, based on the first external input, update mode of another application other than the at least one application from a work mode to a non-work mode, and a display that displays a work time regarding the at least one application that is determined based on at least one of information indicating a time point at which the first external input is obtained and information indicating a time point at which the mode of the at least one application is updated from the non-work mode to the work mode.

In accordance with another aspect of the present disclosure, a method of managing a plurality of applications executed on an electronic device is provided. The method includes obtaining time point information including information indicating a time point at which an external input regarding at least one application from among a plurality of applications executed on a first electronic device and a second electronic device, determining a work time regarding the at least one application based on the time point information, and transmitting a message including information indicating the determined work time to at least one of the first electronic device and the second electronic device.

Furthermore, the time point information may include information indicating a time point at which mode of the at least one application is updated from a non-work mode to a work mode based on the external input.

Furthermore, the determining of the work time may include determining the work time based on at least one of information indicating a time point at which the external input is obtained and the information indicating the time point at which the mode of the at least one application is updated from the non-work mode to the work mode.

Furthermore, the determining of the work time may include obtaining a first work time, which is a work time regarding the at least one application executed on the first electronic device, obtaining a second work time, which is a work time regarding the at least one application executed on the second electronic device, and determining a time period obtained by subtracting an overlapping portion between the first work time and the second work time from a sum of the first work time and the second work time as the work time.

Furthermore, the obtaining of the time point information may include obtaining first time point information indicating a time point at which a first external input regarding an application executed on the first electronic device from among the at least one application is obtained, and obtaining second time point information indicating a time point at which a second external input regarding an application executed on the second electronic device from among the at least one application is obtained.

Furthermore, the obtaining of the time point information may include obtaining third time point information indicating a time point at which an external input other than the first external input regarding the application executed on the first electronic device from among the at least one application, and obtaining fourth time point information indicating a time point at which an external input other than the second external input regarding the application executed on the second electronic device from among the at least one application.

Furthermore, in the determining of the work time, the work time may be determined based on the first through fourth work times.

Furthermore, in the determining of the work time, when the first time point is earlier than the second time point and the second time point is earlier than the third time point, a time period from the first time point to the fourth time point may be determined as the work time.

Furthermore, in the determining of the work time, when the third time point is earlier than the second time point, a sum of a time period from the time point at which the first external input is obtained to the third time point and a time period from the second time point to the fourth time point may be determined as the work time.

Furthermore, in the determining of the work time, when the first time point is earlier than the second time point and the fourth time point is earlier than the third time point, a time period from the first time point to the third time point may be determined as the work time.

Furthermore, the obtaining of the time point information may include receiving heartbeat messages including the time point information from the first electronic device and the second electronic device, respectively.

In accordance with another aspect of the present disclosure, a non-transitory computer readable recording medium having recorded thereon a computer program for implementing the method of the first aspect is provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
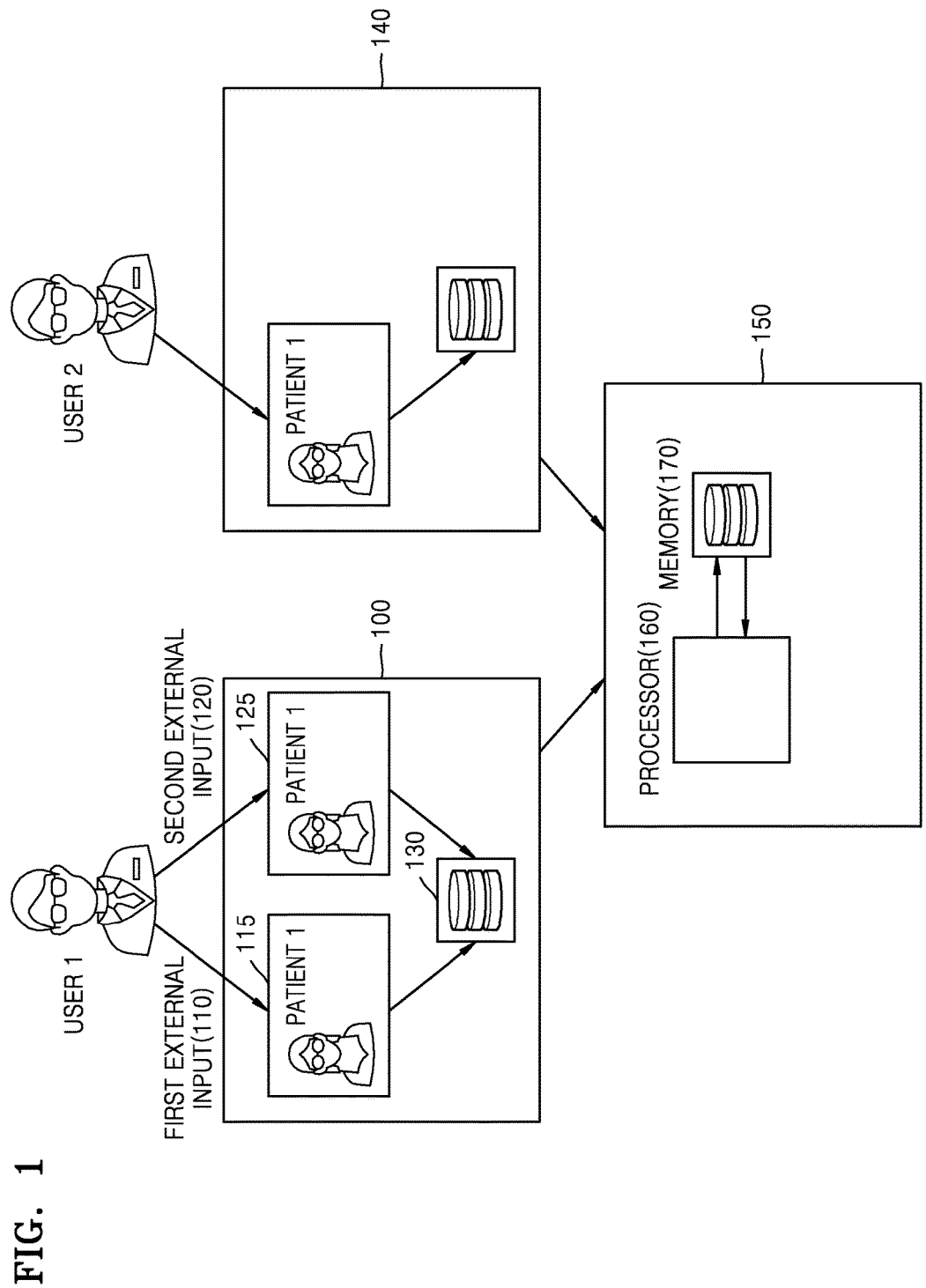
FIG. 1 is a diagram showing a method by which an electronic device and a server determine work time regarding at least one application executed on the electronic device in conjunction with each other according to an embodiment of the present disclosure.

FIG. 1 is a diagram showing a method used by both an electronic device 100 and a server 150 to determine a work time of at least one application executed on the electronic device 100 according to an embodiment of the present disclosure.

Referring to FIG. 1, throughout the present specification, an application may include all applications having particular purposes, e.g., a web application executed via a web browser, a game application, a remote service providing application, etc.

Furthermore, when mode of an application executed on the electronic device 100 is a work mode, a task may be currently being performed by the corresponding application. For example, when a mode of an application is a work mode, the corresponding application may have been executed on an electronic device and obtained a current focus. On the contrary, when mode of an application is a non-work mode, no task may be currently being performed by the corresponding application. For example, when an application, which is executed on an electronic device and is activated, is unable to obtain a current focus, the mode of the corresponding application may be a non-work mode.

Throughout the present specification, an external input according to an embodiment may include an input for invoking at least one application, which is the target of the external input, or an input for clicking a certain area corresponding to at least one application, which is the target of the external input, but the present specification is not limited thereto. For example, when an application is an execution window of a particular application, an external input may include an input for invoking an input window, an input for activating an execution window, or an input for clicking a certain area corresponding to the execution window.

The electronic device 100 according to an embodiment may execute a plurality of applications. For example, the electronic device 100 may execute a first application 115 and a second application 125. Furthermore, a second electronic device 140 according to an embodiment may execute one or more applications. Furthermore, the server 150 according to an embodiment may exchange data with the electronic device 100 and the second electronic device 140 via a transceiver.

The first application 115 and the second application 125 may be displayed in a first execution window and a second execution window of a particular application, respectively. For example, when the particular application is a web browser, the first application 115 may be a first web browser instance, whereas the second application 125 may be a second web browser instance. A web browser instance may include an object associated with a web browser, e.g., a web browser window or a web browser tab.

The electronic device 100 may update a mode of the first application 115 from a non-work mode to a work mode based on a first external input 110 regarding the first application 115 being executed on the electronic device 100. For example, when the mode of the first application 115 is a non-work mode and the electronic device 100 obtains the first external input 110 regarding the first application 115, the electronic device 100 may update the mode of the first application 115 to a work mode.

When the first external input 110 is obtained, the electronic device 100 may determine whether the mode of the first application 115 is a work mode or a non-work mode. When the first external input 110 is obtained and the electronic device 100 determines that the mode of the first application 115 is the work mode, the electronic device 100 may maintain the work mode of the first application 115.

Furthermore, when the first external input 110 is obtained and the electronic device 100 determines that the mode of the first application 115 is the non-work mode, the electronic device 100 may update the mode of the first application 115 from the non-work mode to a work mode.

The electronic device 100 may store an ID of the first application 115, which is the target of the first external input 110, in a memory 130. The electronic device 100 may store at least one of information indicating a time point at which the first external input 110 is obtained and information indicating a time point at which the mode of the first application 115 is updated to a work mode based on the first external input 110 in the memory 130.

The electronic device 100 may combine at least one of information indicating a time point at which the first external input 110 is obtained and information indicating a time point at which the mode of the first application 115 is updated to a work mode based on the first external input 110 with the ID of the first application 115 and store the combined information in the memory 130.

The term "memory" should be interpreted in a broad manner as including electronic components capable of storing electronic information. The term "memory" may also refer to various types of processor-readable media, such as a random access memory (RAM), a read-only memory (ROM), a non-volatile random access memory (NVRAM), a programmable read-only memory (PROM), an erasable-programmable read-only memory (EPROM), an electrically erasable-programmable read-only memory (EEPROM), a flash memory, a magnetic or optical data storage device, and a register. When a processor may read information from a memory or write information to the memory, the memory may be in electronic communication with the processor. A memory integrated in a processor is in electronic communication with the processor.

If the mode of the first application 115 being executed on the electronic device 100 is the work mode, the electronic device 100 may determine that work is being performed by the first application 115. Furthermore, if the mode of the first application 115 is the work mode, the electronic device 100 may determine a work time based on an execution time of the first application 115.

The electronic device 100 may update a mode of the second application 125 from a work mode to a non-work mode based on the first external input 110 regarding the first application 115 being executed on the electronic device 100. For example, when the mode of the first application 115 is a work mode and the electronic device 100 obtains the first external input 110 regarding the first application 115, the electronic device 100 may update the mode of the first application 115 to the non-work mode.

When the first external input 110 is obtained, the electronic device 100 may determine whether the mode of the second application 125 is the work mode or the non-work mode. When the first external input 110 is obtained and the electronic device 100 determines that the mode of the second application 125 is a work mode, the electronic device 100 may update the mode of the second application 125 to a non-work mode. Furthermore, when the first external input 110 is obtained and the electronic device 100 determines that mode of the second application 125 is a non-work mode, the electronic device 100 may maintain the non-work mode of the second application 125.

The electronic device 100 may store identification (ID) of the second application 125, which is the target of a second external input, in a memory 130. The electronic device 100 may store at least one of information indicating a time point at which the first external input 110 is obtained and information indicating a time point at which the mode of the second application 125 is updated to the non-work mode based on the first external input 110 in the memory 130.

The electronic device 100 may combine at least one of information indicating a time point at which the first external input 110 is obtained and information indicating a time point at which the mode of the second application 125 is updated to the non-work mode based on the first external input 110 with the ID of the second application 125 and store the combined information in the memory 130.

When the mode of the second application 125 being executed on the electronic device 100 is the non-work mode, the electronic device 100 may determine that no work is performed by the second application 125. When the mode of the second application 125 being executed on the electronic device 100 is the non-work mode, the electronic device 100 may not take an execution time of the second application 125 into account for determining a work time.

The electronic device 100 may update the mode of the second application 125 from the non-work mode to the work mode based on a second external input 120 regarding the second application 125 being executed on the electronic device 100. For example, when the mode of the second application 125 is the non-work mode and the electronic device 100 obtains the second external input 120 regarding the second application 125, the electronic device 100 may update the mode of the second application 125 to the work mode.

When the second external input 120 is obtained, the electronic device 100 may determine whether the mode of the second application 125 is the work mode or the non-work mode. When the second external input 120 is obtained and the electronic device 100 determines that the mode of the second application 125 is the work mode, the electronic device 100 may maintain the work mode of the second application 125. Furthermore, when the second external input 120 is obtained and the electronic device 100 determines that the mode of the second application 125 is the non-work mode, the electronic device 100 may update the mode of the second application 125 from the non-work mode to the work mode.

The electronic device 100 may store an ID of the second application 125, which is the target of the second external input 120, in a memory 130. The electronic device 100 may store at least one of information indicating a time point at which the second external input 120 is obtained and information indicating a time point at which the mode of the second application 125 is updated to the work mode based on the second external input 120 in the memory 130.

The electronic device 100 may combine at least one of information indicating a time point at which the second external input 120 is obtained and information indicating a time point at which the mode of the second application 125 is updated to the work mode based on the second external input 120 with the ID of the second application 125 and store the combined information in the memory 130.

When the mode of the second application 125 being executed on the electronic device 100 is the work mode, the electronic device 100 may determine that work is being performed by the second application 125. When the mode of the second application 125 being executed on the electronic device 100 is a work mode, the electronic device 100 may determine a work time based on execution time of the second application 125.

The electronic device 100 may update the mode of the second application 125 from the work mode to the non-work mode based on the second external input 120 regarding the second application 125 being executed on the electronic device 100. For example, when the mode of the second application 125 is the work mode and the electronic device 100 obtains the second external input 120 regarding the second application 125, the electronic device 100 may update the mode of the second application 125 to the non-work mode.

As the second external input 120 regarding the second application 125 is obtained, the electronic device 100 may determine whether the mode of the first application 115 is the work mode or the non-work mode when the second external input 120 regarding the second application 125 is obtained. When the second external input 120 regarding the second application 125 is obtained and the electronic device 100 determines that the mode of the first application 115 is the work mode, the electronic device 100 may update the mode of the first application 115 from the work mode to the non-work mode.

When the second external input 120 regarding the second application 125 is obtained and the electronic device 100 determines that the mode of the first application 115 is the non-work mode, the electronic device 100 may maintain the non-work mode of the first application 115.

The electronic device 100 may store an ID of the first application 115 in the memory 130. The electronic device 100 may store at least one of information indicating a time point at which the second external input 120 is obtained and information indicating a time point at which the mode of the first application 115 is updated to the work mode based on the second external input 120 in the memory 130.

The electronic device 100 may combine at least one of information indicating a time point at which the second external input 120 is obtained and information indicating a time point at which mode of the first application 115 is updated to the work mode based on the second external input 120 with the ID of the first application 115 and store the combined information in the memory 130.

When the mode of the first application 115 being executed on the electronic device 100 is the non-work mode, the electronic device 100 may determine that no work is performed by the first application 115. When mode of the first application 115 being executed on the electronic device 100 is the non-work mode, the electronic device 100 may not take an execution time of the first application 115 into account for determining a work time.

The electronic device 100 may display work times of the first application 115 and the second application 125 being executed on the electronic device 100, the work times being determined based on time point information stored in the memory 130.

A work time according to an embodiment may be a sum of a work time of the first application 115 and a work time of the second application 125. A work time of the first application 115 may be a time period during which a work mode of the first application 115 is maintained.

For example, a work time of the first application 115 may be from either a time point at which the first external input 110 is input or a time point at which the mode of the first application 115 is updated to the work mode based on the first external input 110 to either a time point at which the second external input 120 is input or a time point at which the mode of the first application 115 is updated to the non-work mode based on the second external input 120.

A work time of the second application 125 may be a time period during which a work mode of the second application 125 is maintained. A work time of the first application 115 and the second application 125 according to an embodiment may be a sum of a time period during which the work mode of the first application 115 is maintained and a time period during which the work mode of the second application 125 is maintained.

A work time of the first application 115 and the second application 125 being executed on the electronic device 100 may be determined by the electronic device 100 and/or the server 150.

The electronic device 100 may transmit an ID of an application and time point information stored in the memory 130 to the server 150. The electronic device 100 may transmit a heartbeat message including an ID of an application and time point information stored in the memory 130 to the server 150. A heartbeat signal may include periodic signals generated by a browser.

Time point information transmitted by the electronic device 100 to the server 150 may include at least one information indicating a time point at which the first external input 110 regarding the first application 115 is obtained, a time point at which the mode of the first application 115 is updated from the non-work mode to the work mode, and a time point at which the mode of the first application 115 is updated from the work mode to the non-work mode.

Time point information transmitted by the electronic device 100 to the server 150 may include at least one information indicating a time point at which the second external input 120 regarding the second application 125 is obtained, a time point at which mode of the second application 125 is updated from the non-work mode to the work mode, and a time point at which the mode of the second application 125 is updated from the work mode to the non-work mode.

The server 150 may receive time point information from the electronic device 100. Furthermore, the server 150 may receive time point information corresponding to the time point information received from the electronic device 100 from the second electronic device 140. The server 150 may store time point information received from the electronic device 100 and the second electronic device 140 in a memory 170.

The server 150 may determine work times of one or more applications executed on the electronic device 100 and the second electronic device 140 based on time point information received from the electronic device 100 and the second electronic device 140, respectively. The server 150 may transmit information indicating determined work times to the electronic device 100 and the second electronic device 140. The server 150 may transmit heartbeat messages including information indicating determined work times to the electronic device 100 and the second electronic device 140, respectively. The server 150 may utilize a processor 160 to at least one of control or perform any of the operations described herein as being performed by the server 150.

Figure 2:
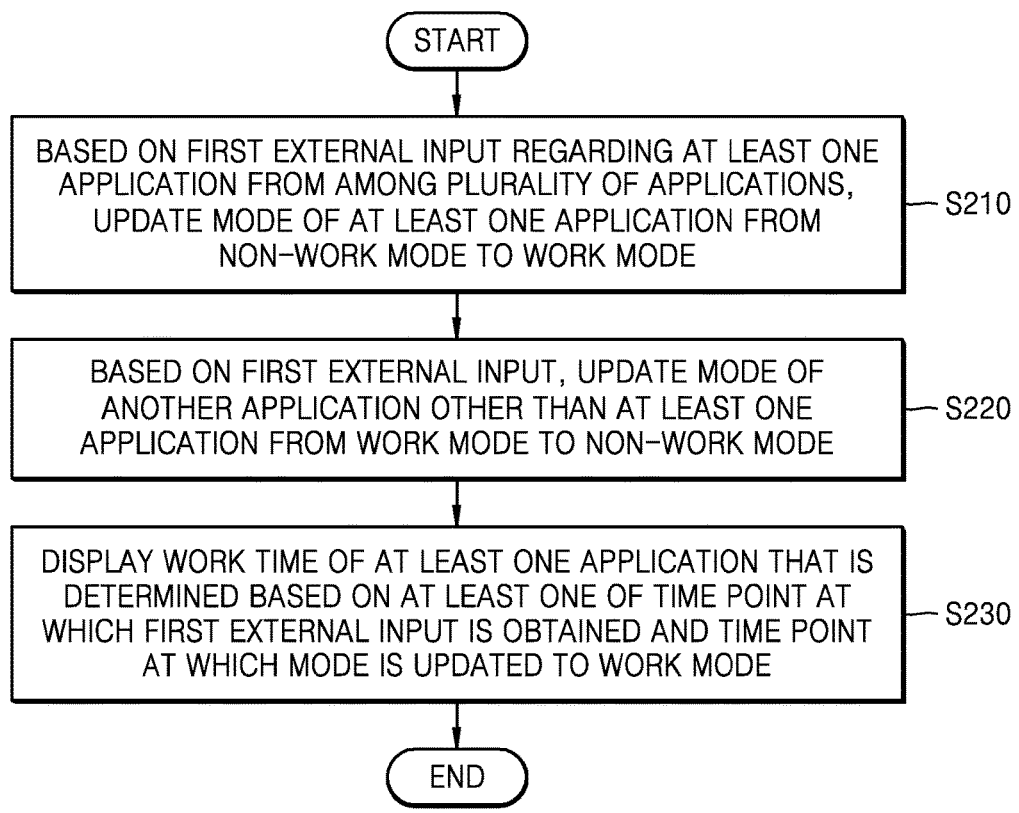
FIG. 2 is a flowchart showing a method by which the electronic device determines a work time regarding at least one application from among a plurality of applications being executed on the electronic device, according to an embodiment of the present disclosure.

FIG. 2 is a flowchart of a method used by the electronic device 100 to determine a work time of at least one application from among a plurality of applications being executed on the electronic device 100, according to an embodiment of the present disclosure.

Referring to FIG. 2, in operation S210, the electronic device 100 according to an embodiment may update a mode of at least one application from a non-work mode to a work mode based on a first external input regarding at least one application from among a plurality of applications being executed on the electronic device 100.

The electronic device 100 may obtain a first external input regarding at least one application via an input/output device constituting the electronic device 100. For example, a first external input includes an input corresponding to a click of a keyboard button or an input corresponding to a click of a mouse button, but is not limited thereto.

Furthermore, as the first external input is obtained, the electronic device 100 may determine at least one application, which is the target of the first external input.

Furthermore, when the first external input is obtained, the electronic device 100 may determine a mode of the at least one application, which is the target of the first external input. The mode of the at least one application may be a work mode or a non-work mode. In FIG. 2, when a first external input is obtained, the electronic device 100 may determine the mode of at least one application, which is the target of the first external input, as a non-work mode.

Furthermore, as the mode of the at least one application, which is the target of the first external input, is determined when the first external input is obtained, the electronic device 100 may update a mode of the at least one application from a non-work mode to a work mode or may maintain a work mode of the at least one application.

When a first external input is obtained and a mode of at least one application, which is the target of the first external input, is determined as a non-work mode, the electronic device 100 may update the mode of the at least one application to a work mode. Furthermore, when a first external input is obtained and a mode of at least one application, which is the target of the first external input, is determined as a work mode, the electronic device 100 may maintain the work mode of the at least one application.

In FIG. 2, when a first external input is obtained, the electronic device 100 determines that a mode of at least one application, which is the target of the first external input, is a non-work mode, and thus the electronic device 100 may update a mode of the at least one application to the work mode.

In operation S220, the electronic device 100 may update a mode of another application from among a plurality of applications other than the at least one application, which is the target of the first external input, from a work mode to a non-work mode, based on the first external input.

When the first external input is obtained, the electronic device 100 may determine whether a mode of another application other than the at least one application, which is the target of the first external input, is a work mode or a non-work mode. In FIG. 2, when a first external input is obtained, the electronic device 100 may determine that a mode of another application other than the at least one application, which is the target of the first external input, is a work mode.

Furthermore, when a first external input is obtained, the electronic device 100 determines a mode of another application other than the at least one application, which is the target of the first external input, and thus the electronic device 100 may update the mode of the other application to a non-work mode or may maintain the non-work mode of the at least one application.

When a first external input is obtained and it is determined that a mode of the other application is a work mode, the electronic device 100 may update the mode of the other application to a non-work mode. When a first external input is obtained and it is determined that a mode of the other application is a non-work mode, the electronic device 100 may maintain the non-work mode of the other application.

In FIG. 2, when a first external input is obtained and it is determined that the mode of the other application is the work mode, the electronic device 100 may update the mode of the other application to the non-work mode.

In operation S230, the electronic device 100 may display a work time of at least one application determined based on at least one of information indicating a time point at which a first external input is obtained and information indicating a time point at which mode of the at least one application is updated to the work mode based on the first external input.

The electronic device 100 may obtain at least one of information indicating a time point at which a first external input is obtained and information indicating a time point at which the mode of the at least one application is updated to the work mode based on the first external input. For example, the electronic device 100 may obtain at least one of a time stamp indicating a time point at which a first external input is obtained and a time stamp indicating a time point at which the mode of the at least one application is updated to the work mode based on the first external input. The time stamp refers to visual information displayed at a particular location in order to prove existence of data at a certain time point.

Furthermore, the electronic device 100 may determine a time period from at least one of a time point at which a first external input is obtained and a time point at which the mode of the at least one application is updated from a non-work mode to a work mode based on the first external input to a time point at which a work time is determined as a work time regarding the at least one application.

Furthermore, the electronic device 100 may determine a time period from at least one of a time point at which a first external input is obtained and a time point at which the mode of the at least one application is updated from the non-work mode to the work mode based on the first external input to a time point at which another external input regarding the at least one application in the work mode is obtained as a work time regarding the at least one application.

The electronic device 100 may determine a sum of a work time of at least one application, which is the target of a first external input, and a previous work time as a work time of a plurality of applications executed on the electronic device 100.

Furthermore, the electronic device 100 may display a work time of at least one application. The electronic device 100 may display work times of a plurality of applications.

Figure 3:
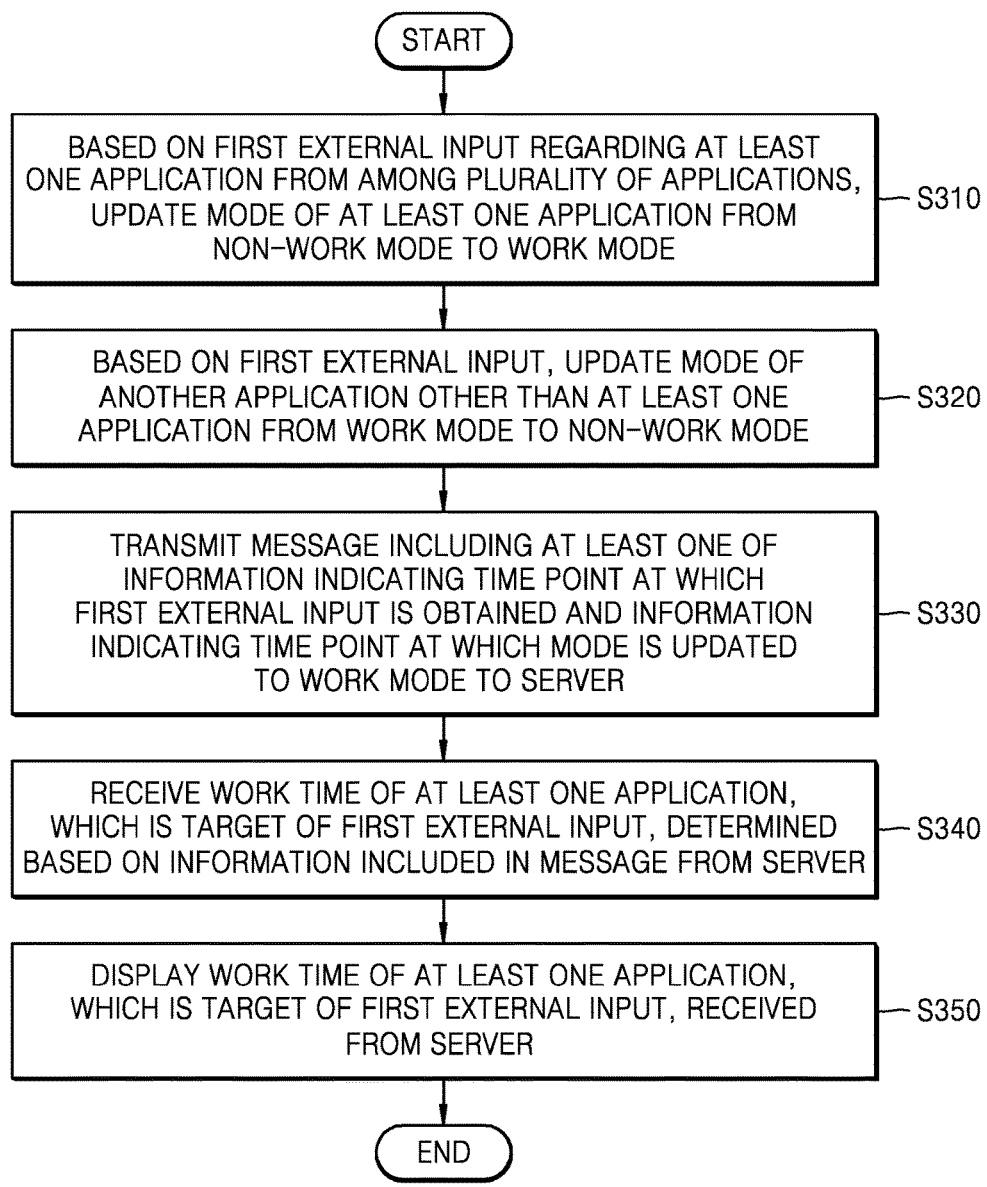
FIG. 3 is a flowchart showing a method by which the server determines a work time regarding an application executed on the electronic device, according to an embodiment of the present disclosure.

FIG. 3 is a flowchart of a method used by the server 150 to determine a work time of an application executed on the electronic device 100, according to an embodiment according to an embodiment of the present disclosure.

Referring to FIG. 3, operations S310 and S320 of FIG. 3 correspond to the operations S210 and S220 of FIG. 2, respectively. Therefore, detailed descriptions thereof are omitted.

In operation S330, the electronic device 100 may transmit a message including at least one of information indicating a time point at which a first external input is obtained and information indicating a time point at which the mode of the at least one application is updated to the work mode based on the first external input to the server 150.

At least one of information indicating a time point at which a first external input is obtained and information indicating a time point at which the mode of the at least one application is updated to the work mode based on the first external input that are transmitted by the electronic device 100 to the server 150 may be stored in the memory 130 of the electronic device 100.

The electronic device 100 may transmit a heartbeat message including at least one of information indicating a time point at which a first external input is obtained and information indicating a time point at which the mode of the at least one application is updated to the work mode based on the first external input to the server 150.

A heartbeat message according to an embodiment may be transmitted by the electronic device 100 to the server 150 based on a counter allocated to at least one application in a work mode. Heartbeat messages may be transmitted by the electronic device 100 to the server 150 based on at least one application in a work mode at a pre-set interval.

In operation S340, the electronic device 100 may receive a work time of at least one application that is determined based on at least one of information indicating a time point at which a first external input is obtained and information indicating a time point at which the mode of the at least one application is updated to the work mode from the server 150.

For example, the server 150 may determine a time period from at least one of a time point at which a first external input is obtained and a time point at which the mode of the at least one application is updated to the work mode to a time point at which a work time is determined as a work time of the at least one application. Alternatively, the server 150 may determine a time period from at least one of a time point at which a first external input is obtained and a time point at which the mode of the at least one application is updated to the work mode to a time point at which another external input regarding the at least one application in the work mode is obtained as a work time regarding the at least one application.

Furthermore, the server 150 may determine a sum of a work time of at least one application, which is the target of a first external input, and a previous work time as a work time of a plurality of applications. For example, in FIG. 3, a sum of a work time of the other application and a work time before mode of another application is updated from a work mode to a non-work mode based on a first external input and a work time of the at least one application after mode of the at least one application is updated from a non-work mode to a work mode based on the first external input as a work time of a plurality of applications.

Furthermore, the electronic device 100 may receive a work time of at least one application from the server 150. The electronic device 100 may receive a work time of a plurality of applications from the server 150.

In operation S350, the electronic device 100 may display a work time received from the server 150. The electronic device 100 may display a work time of at least one application, which is the target of a first external input, received from the server 150 at a display. Furthermore, the electronic device 100 may display a work time of a plurality of application received from the server 150 at the display.

Figure 4:
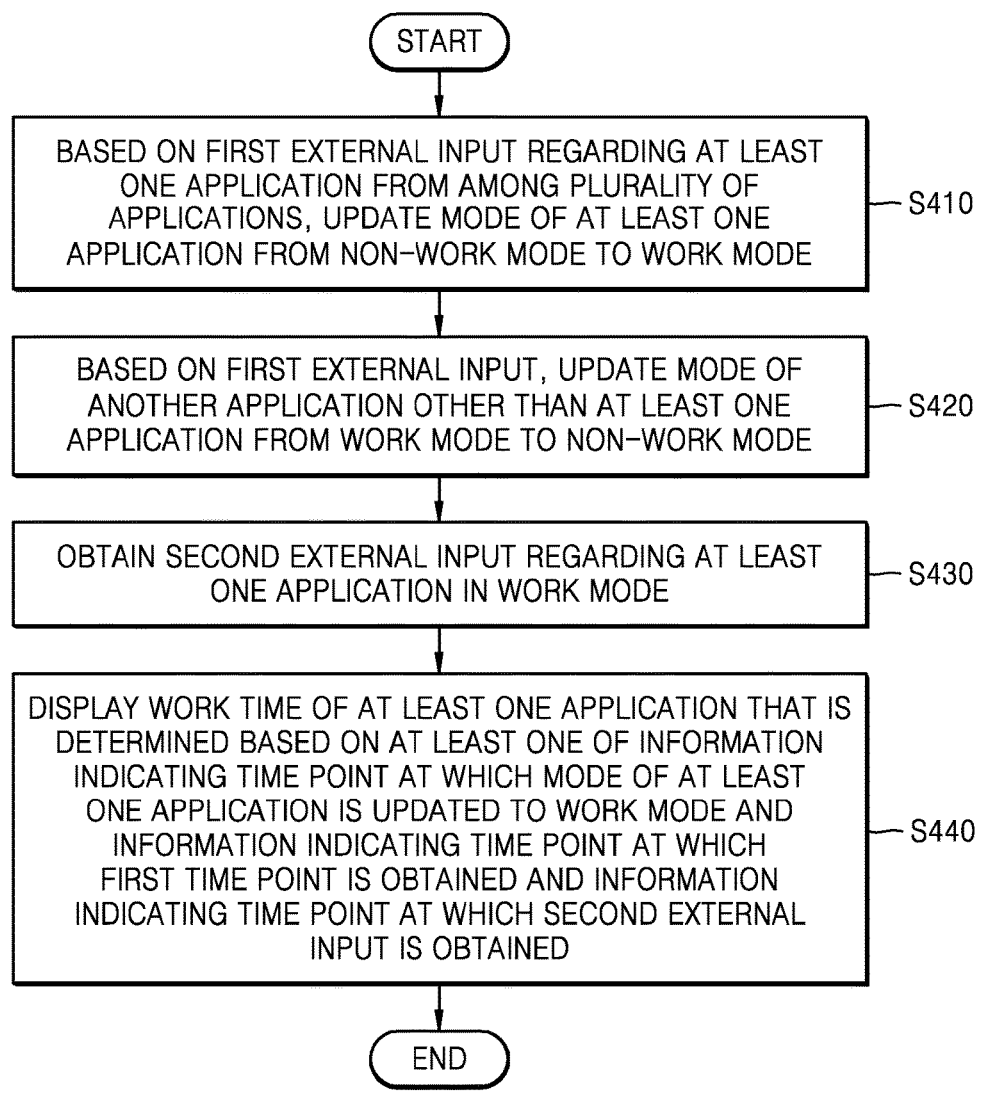
FIG. 4 is a flowchart showing a method by which the electronic device determines a work time regarding an application being executed on the electronic device based on a plurality of external inputs, according to an embodiment of the present disclosure.

FIG. 4 is a flowchart of a method used by the electronic device 100 to determine a work time of an application being executed on the electronic device 100 based on a plurality of external inputs, according to an embodiment of the present disclosure.

Referring to FIG. 4, operations S410 and S420 of FIG. 4 correspond to the operations S210 and S220 of FIG. 2, respectively. Therefore, detailed descriptions thereof are omitted.

In operation S430, when a mode of at least one application being executed is a work mode, the electronic device 100 may obtain a second external input regarding the at least one application.

The electronic device 100 may obtain the second external input regarding the at least one application via an input device.

In operation S440, the electronic device 100 may display a work time of the at least one application determined based on a time point at which a first external input is obtained and a time point at which the second external input is obtained.

The electronic device 100 may determine a work time of at least one application determined based on a time point at which a first external input is obtained and a time point at which a second external input is obtained. For example, the electronic device 100 may determine a time period from at least one of a time point at which the first external input is obtained and a time point at which the mode of the at least one application is updated to the work mode based on the first external input to a time point at which the second external input is obtained as a work time of the at least one application.

In FIG. 4, after a mode of at least one application is updated from a non-work mode to a work mode based on a first external input of the at least one application, when a second external input regarding the at least one application is obtained while the work mode of the at least one particular application is maintained, the electronic device 100 may determine a time period from at least one of a time point at which the first external input is obtained and a time point at which the mode of the at least one application is updated from a non-work mode to the work mode based on the first external input to a time point at which the second external input is obtained as a work time of the at least one application.

Furthermore, the electronic device 100 may display the work time of the at least one application.

Figure 5:
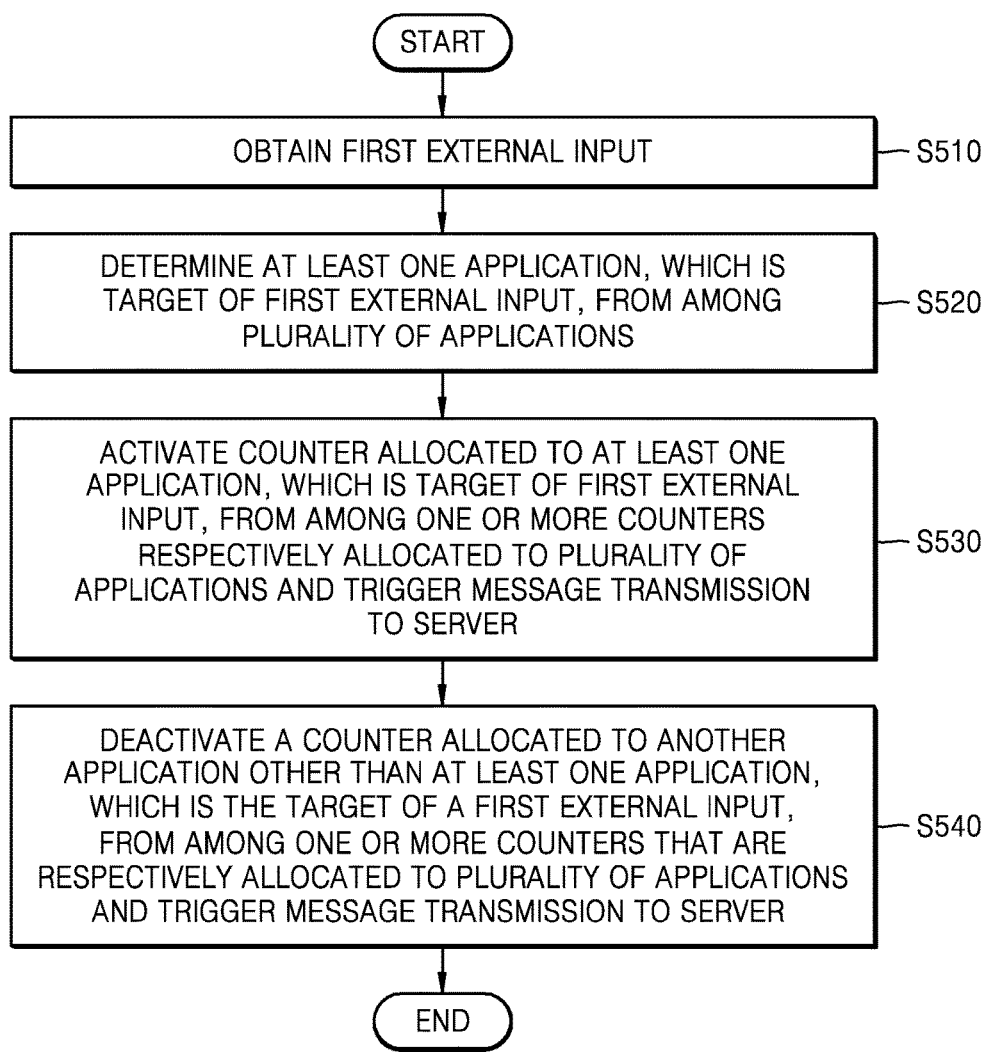
FIG. 5 is a flowchart showing a process performed by the electronic device as mode of an application is updated to a work mode or a non-work mode based on an external input, according to an embodiment of the present disclosure.

FIG. 5 is a flowchart showing a process performed by the electronic device 100 as a mode of an application is updated to a work mode or a non-work mode based on an external input, according to an embodiment of the present disclosure.

Referring to FIG. 5, in operation S510, the electronic device 100 may obtain a first external input.

In operation S520, the electronic device 100 may determine at least one application, which is the target of the first external input, from among a plurality of applications executed on the electronic device 100.

In operation S530, the electronic device 100 may activate a counter allocated to the at least one application, which is the target of the first external input, from among one or more counters that are respectively allocated to a plurality of applications and trigger a message transmission to the server 150. The activation of the counter that is allocated to the at least one application, which is the target of the first external input, and triggers a message transmission to the server 150 may refer to updating of the mode of the at least one application, which is the target of the first external input, to a work mode.

When the electronic device 100 obtains an external input, the electronic device 100 may store information indicating a time point at which the external input is obtained in a shared memory shared by a plurality of particular application executed on the electronic device 100. Furthermore, when an external input is obtained, the electronic device 100 may store information indicating a time point at which the external input is obtained in a local memory allocated to at least one application, which is the target of the first external input, from among local memories respectively allocated to a plurality of applications.

For example, as a first external input is obtained, the electronic device 100 may store information indicating a time point at which the first external input is obtained in a share memory. Furthermore, the electronic device 100 may store the information indicating a time point at which the first external input is obtained in a local memory allocated to the at least one application, which is the target of the first external input.

Furthermore, the electronic device 100 may compare a time point at which the latest external input is obtained stored in a shared memory to time points at which the latest external inputs regarding respective applications are obtained stored in local memories allocated to the respective applications. When a time point at which the latest external input regarding an application is obtained stored in a local memory allocated to the corresponding application is identical to the time point at which the latest external input is obtained stored in a shared memory, at least one counter allocated to the corresponding application may be activated.

For example, when an external input regarding at least one application is obtained, information indicating a time point at which the latest external input is obtained stored in a share memory is information indicating a time point at which the first external input is obtained and information indicating a time point at which the latest external input regarding the at least one application is obtained stored in a local memory allocated to the at least one application is also information indicating a time point at which the first external input is obtained, the electronic device 100 may activate a counter that is allocated to the at least one application and trigger a message transmission to the server 150.

As a counter that triggers a message transmission to the server 150 is activated, the electronic device 100 may transmit information indicating a time point at which the first external input regarding the at least one application having allocated thereto the activated counter is obtained to the server 150. Furthermore, while the counter that triggers message transmission to the server 150 is being activated, the electronic device 100 may, at a constant interval, transmit information indicating a time point at which the last external input regarding the at least one application is obtained during each interval. However, the inventive concept is not limited thereto.

In operation S540, from among one or more counters that are respectively allocated to a plurality of applications and trigger message transmission to the server 150, the electronic device 100 may deactivate a counter allocated to another application other than at least one application, which is the target of a first external input. The activation of the counter that is allocated to another application other than the at least one application, which is the target of the first external input, and triggers a message transmission to the server 150 may refer to updating of the mode of the other application to a non-work mode.

For example, when a first external input regarding at least one application is obtained, information indicating a time point at which the latest external input is obtained stored in a share memory is information indicating a time point at which the first external input is obtained and information indicating a time point at which the latest external input regarding the another application is obtained stored in a local memory allocated to the other application is different from the information indicating the time point at which the first external input is obtained, the electronic device 100 may deactivate a counter that is allocated to the other application and triggers a message transmission to the server 150.

Figure 6:
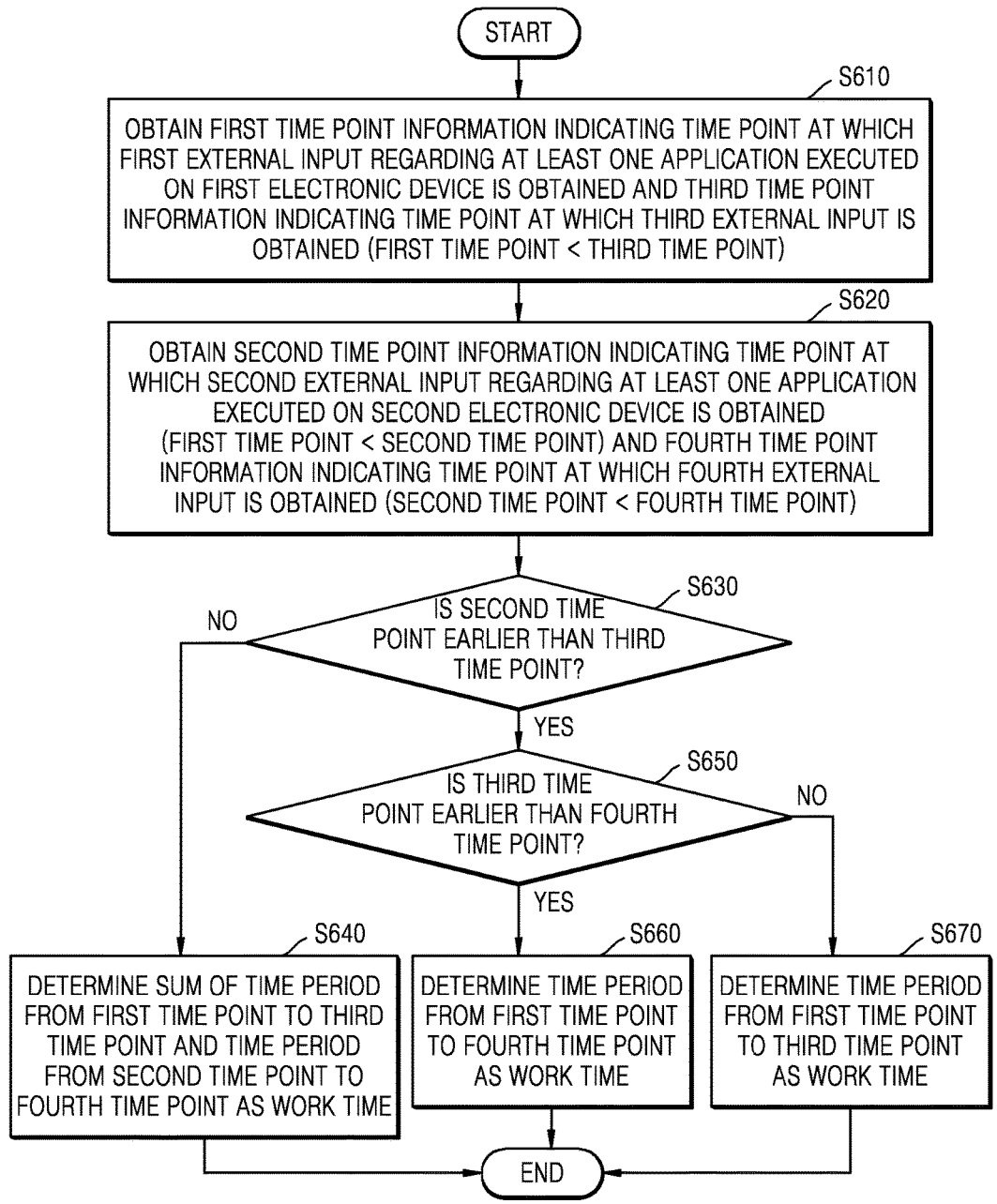
FIG. 6 is a flowchart showing a method by which the server determines a work time based on information indicating respective time points, at which a plurality of external inputs is obtained, which is received from the electronic device and the second electronic device, according to an embodiment of the present disclosure.

FIG. 6 is a flowchart of a method used by the server 150 to determine a work time based on information indicating respective time points, at which a plurality of external inputs is obtained, which is received from the electronic device 100 and the second electronic device 140, according to an embodiment of the present disclosure.

Referring to FIG. 6, the electronic device 100 may receive a first external input and a third external input regarding a first application executed on the electronic device 100. The electronic device 100 may update a mode of the first application from a non-work mode to a work mode based on the first external input regarding the first application. Furthermore, while the work mode of the first application is being maintained, the electronic device 100 may receive the third external input regarding the first application.

Furthermore, the electronic device 100 may receive a second external input and a fourth external input regarding a second application executed on the electronic device 100. The electronic device 100 may update a mode of the second application from a non-work mode to a work mode based on the second external input regarding the second application. Furthermore, while the work mode of the second application is being maintained, the electronic device 100 may receive the fourth external input regarding the second application.

In operation S610, the server 150 may receive first time point information indicating a time point at which a first external input is obtained and a third time point information indicating a time point at which a third external input is obtained from the electronic device 100. In the embodiment shown in FIG. 6, the first time point may be earlier than the third time point.

In operation S620, the server 150 may receive second time point information indicating a time point at which a second external input is obtained and a fourth time point information indicating a time point at which a fourth external input is obtained from the second electronic device 140. In the embodiment shown in FIG. 6, the second time point may be earlier than the fourth time point and the first time point may be earlier than the second time point.

In operation S630, the server 150 may determine whether the second time point is earlier than the third time point.

When it is determined in operation S630 that the third time point is earlier than the second time point, in operation S640, the server 150 may determine a sum of a time period from the first time point to the third time point and a time period from the second time point to the fourth time point as a work time of a plurality of applications executed on the plurality of electronic devices 100 and 140.

When it is determined in operation S630 that the second time point is earlier than the third time point, in operation S650, the server 150 may determine whether the third time point is earlier than the fourth time point.

When it is determined in operation S650 that the third time point is earlier than the fourth time point, in operation S660, the server 150 may determine a time period from the first time point to the fourth time point as a work time of a plurality of applications executed on the plurality of electronic devices 100 and 140. When it is determined in operation S650 that the fourth time point is earlier than the third time point, in operation S670, the server 150 may determine a time period from the first time point to the third time point as a work time of a plurality of applications executed on the plurality of electronic devices 100 and 140.

Figure 7:
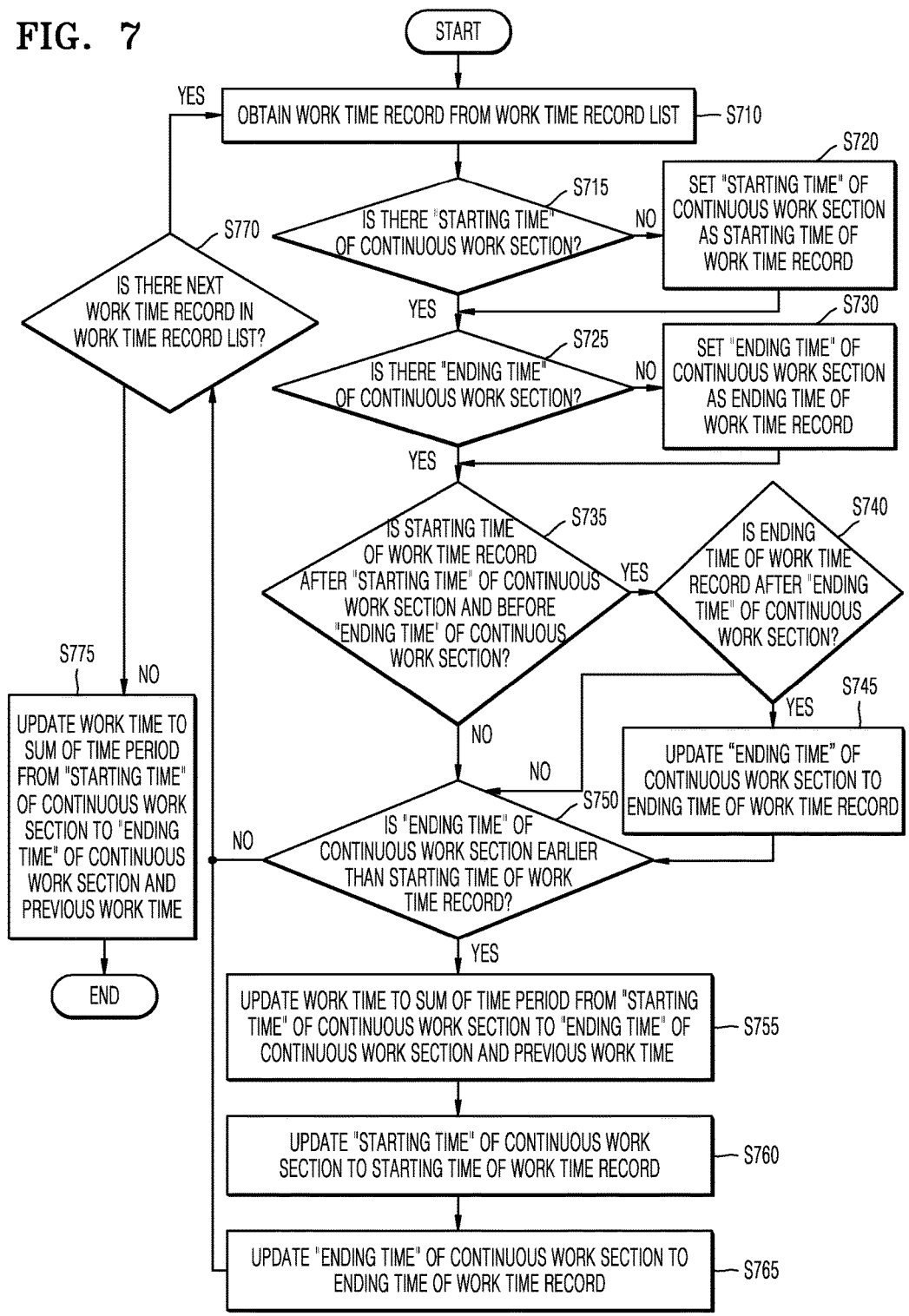
FIG. 7 is a flowchart showing a process that the server determines a work time regarding an application based on one or more work time records respectively received from one or more electronic devices including the electronic device, according to an embodiment of the present disclosure.

FIG. 7 is a flowchart showing a process that the server 150 determines a work time of one or more applications based on one or more work time records respectively received from one or more electronic devices including the electronic device 100, according to an embodiment of the present disclosure.

Referring to FIG. 7, a continuous work period section may be a section during which a mode of at least one application from among one or more applications being executed on one or more electronic devices including the electronic device 100 is a work mode at all time points. For example, when a first application and a second application are executed on the electronic device 100 and only a third application is executed on the second electronic device 140, a mode of at least one application from among the first through third applications may be a work mode during a continuous work section.

Furthermore, a continuous work section may include a "starting time" and an "ending time."

The "starting time" of a continuous work section may indicate a time point at which a section during which a mode of at least one application from among one or more applications being executed on one or more electronic devices is a non-work mode is changed to a section during which the mode of the at least one application from among the one or more applications being executed on the one or more electronic devices is a work mode.

When a mode of every one or more applications being executed on one or more electronic devices is a non-work mode and, as an external input regarding the at least one application is obtained, the mode of the at least one application corresponding to the external input is updated from the non-work mode to a work mode, the "starting time" of the continuous work section may be set to at least one of a time point at which the external input is obtained or a time point at which the mode of the at least one application is updated to the work mode.

For example, when a first application and a second application being executed on the electronic device 100 are in a non-work mode and a third application being executed on the second electronic device 140 is also in the non-work mode and, as the electronic device 100 obtains a first external input regarding the first application, the mode of the first application is updated to the work mode, the "starting time" of a continuous work section may be set to at least one of a time point at which the first external input is obtained or a time point at which the mode of the first application is updated to the work mode.

The "ending time" of a continuous work section may be a time point at which a section during which mode of at least one application from among one or more applications being executed on one or more electronic devices including the electronic device 100 is a work mode is changed to a section during which the mode of every one or more applications being executed on the one or more electronic devices is a non-work mode.

For example, when a mode of only a first application from among first through third applications being executed on the electronic device 100 and the second electronic device 140 is a work mode and, as the electronic device 100 obtains an input for terminating the first application or an external input regarding an application other than the applications, the mode of the first application is updated to a non-work mode, the first through third applications being executed on the electronic device 100 and the second electronic device 140 are in the non-work mode, where the "ending time" of a continuous work section may be set to a time point at which the external input is obtained or a time point at which the mode of the first application is updated from the work mode to the non-work mode.

A work time record may include time point information necessary for determining a work time of applications after a time point at which mode of each of applications being executed on one or more electronic devices including the electronic device 100 is updated to a work mode until a time point at which the mode of each of the applications is updated to a non-work mode. In detail, a work time record according to an embodiment may include a "starting time" and a "ending time" regarding a work related to an application related to the work time record.

A "starting time" of a work time record may be a time point at which, while mode of an application related to the corresponding work time record is a non-work mode, an external input regarding an application is obtained or a time point at which the mode of the application is updated from the non-work mode to a work mode.

For example, when the electronic device 100 obtains a first external input regarding a first application being executed on the electronic device 100 and a mode of the first application is updated to a work mode, an application, which is the target of a work time record, may be the first application, and the "starting time" of the work time record may be at least one of a time point at which the first external input regarding the first application, which is the target of the work time record, is obtained or a time point at which the mode of the first application is updated to the work mode.

Furthermore, when a mode of another application other than the application, which is the target of the work time record, is updated from a non-work mode to a work mode, the "starting time" of the work time record may be changed.

When an application, which is the target of a work time record, is a first application and, as the electronic device 100 obtains a second external input regarding a second application, a mode of the first application is updated to a non-work mode and a mode of the second application is updated to a work mode, the application, which is the target of the work time record, may be switched to the second application, and the "starting time" of the work time record may be changed to at least one of a time point at which the second external input is obtained or a time point at which the mode of the second application is updated to the work mode.

Furthermore, the "ending time" of a work time record may be at least one of a time point at which, while mode of an application, which is the target of the corresponding work time record, is a work mode, an external input regarding the application, which is the target of the work time record, is obtained and a time point at which the mode of the application is updated from the work mode to a non-work mode. Furthermore, while the mode of the application, which is the target of the work time record, is the work mode, every time an external input regarding the application, which is the target of the work time record, is obtained, the "ending time" of the work time record may be updated to a time point at which the external input is obtained.

For example, while a mode of a first application of the electronic device 100 is a work mode, the target of a work time record is the first application and, as the electronic device 100 obtains a second external input regarding the first application, the "ending time" of the work time record may be set to a time point at which the second external input is obtained, e.g., "13:00." Next, when the electronic device 100 obtains a third external input regarding the first application, the "ending time" of the work time record may be changed to a time point at which the third external input is obtained, e.g., "14:00."

Furthermore, a work time record may be stored in a certain area of the memory 130 allocated to each of one or more electronic devices including the electronic device 100 and may be transmitted to the server 150 from the one or more electronic devices.

A work time record list may be a list of one or more work time records received by the server 150 from one or more electronic devices including the electronic device 100. For example, a work time record list may be a list of one or more work time records stored in a database (DB) in the server 150 the ascending order.

Hereinafter, referring to operations S710 through S770, a method by which the server 150 determines a work time regarding at least one application from among one or more applications being executed on one or more electronic devices including the electronic device 100 by using one or more work time records stored in a work time record list.

In operation S710, the server 150 may obtain a work time record from a work time record list. As described above, work time records may be assorted based on "starting times" of the work time records in the ascending order in the work time record list. For example, the server 150 may sequentially obtain work time records from a work time record list including one or more work time records that are stored in a DB in the server 150 and are assorted based on "starting times" in the ascending order.

In operation S715, the server 150 may determine whether there is the "starting time" of a continuous work section. For example, when a work time record is the first work time record from among work time records in a work time record list, there may be no "starting time" of a continuous work section.

When it is determined in operation S715 that there is no "starting time" of a continuous work section, in operation S720, the server 150 sets the "starting time" of the continuous work section as the starting time of a current work time record and proceeds to an operation S725.

When it is determined in operation S715 that there is the "starting time" of a continuous work section, the server 150 directly proceeds to the operation S725.

In operation S725, the server 150 may determine whether there is the "ending time" of the continuous work section. For example, when a work time record is the first work time record from among work time records in a work time record list, there may be no "ending time" of a continuous work section.

When it is determined in operation S725 that there is no "ending time" of the continuous work section, in operation S730, the server 150 sets the "ending time" of the continuous work section as the ending time of a current work time record and proceeds to an operation S735.

When it is determined in operation S725 that there is the "ending time" of a continuous work section, the server 150 directly proceeds to the operation S735.

In operation S735, the server 150 may determine whether the starting time of a work time record is after the "starting time" of the continuous work section and before the "ending time" of the continuous work section.

In operation S735, when it is determined that the starting time of the work time record is after the "starting time" of the continuous work section and before the "ending time" of the continuous work section, the server 150 may determine in operation S740 whether the ending time of the work time record is after the "ending time" of the continuous work section. When it is determined in operation S740 that the ending time of the work time record is after the "ending time" of the continuous work section, the "ending time" of the continuous work section may be updated to the ending time of the work time record in operation S745 and then the server 150 proceeds to operation S750. When it is determined in operation S740 that the ending time of the work time record is not after the "ending time" of the continuous work section, the server 150 proceeds to operation S750.

In operation S750, the server 150 may determine whether the "ending time" of the continuous work section is earlier than the starting time of the work time record.

When it is determined in operation S750 that the "ending time" of the continuous work section is earlier than the starting time of the work time record, the server 150 performs operation S770 after operations S755 through S765 are performed. In operation S755, the server 150 may update a work time to a sum of a time period from the "starting time" of the continuous work section to the "ending time" of the continuous work section and a previous work time. Furthermore, in operation S760, the server 150 may update the "starting time" of the continuous work section to the starting time of the work time record. Furthermore, in operation S765, the server 150 may update the "ending time" of the continuous work section to the ending time of the work time record. Next, operation S770 is performed.

When it is determined in operation S750 that the "ending time" of the continuous work section is not earlier than the starting time of the work time record, the server 150 directly proceeds to operation S770.

In operation S770, the server 150 may determine whether there is a next work time record in the work time record list.

When it is determined in operation S770 that there is a next work time record in the work time record list, the server 150 proceeds back to operation S710 and performs the following operations. Furthermore, when it is determined in operation S770 that there is no next work time record in the work time record list, in operation S775, the server 150 may update the work time to a sum of a time period from the "starting time" of the continuous work section to the "ending time" of the continuous work section and a previous work time.

Figure 8:
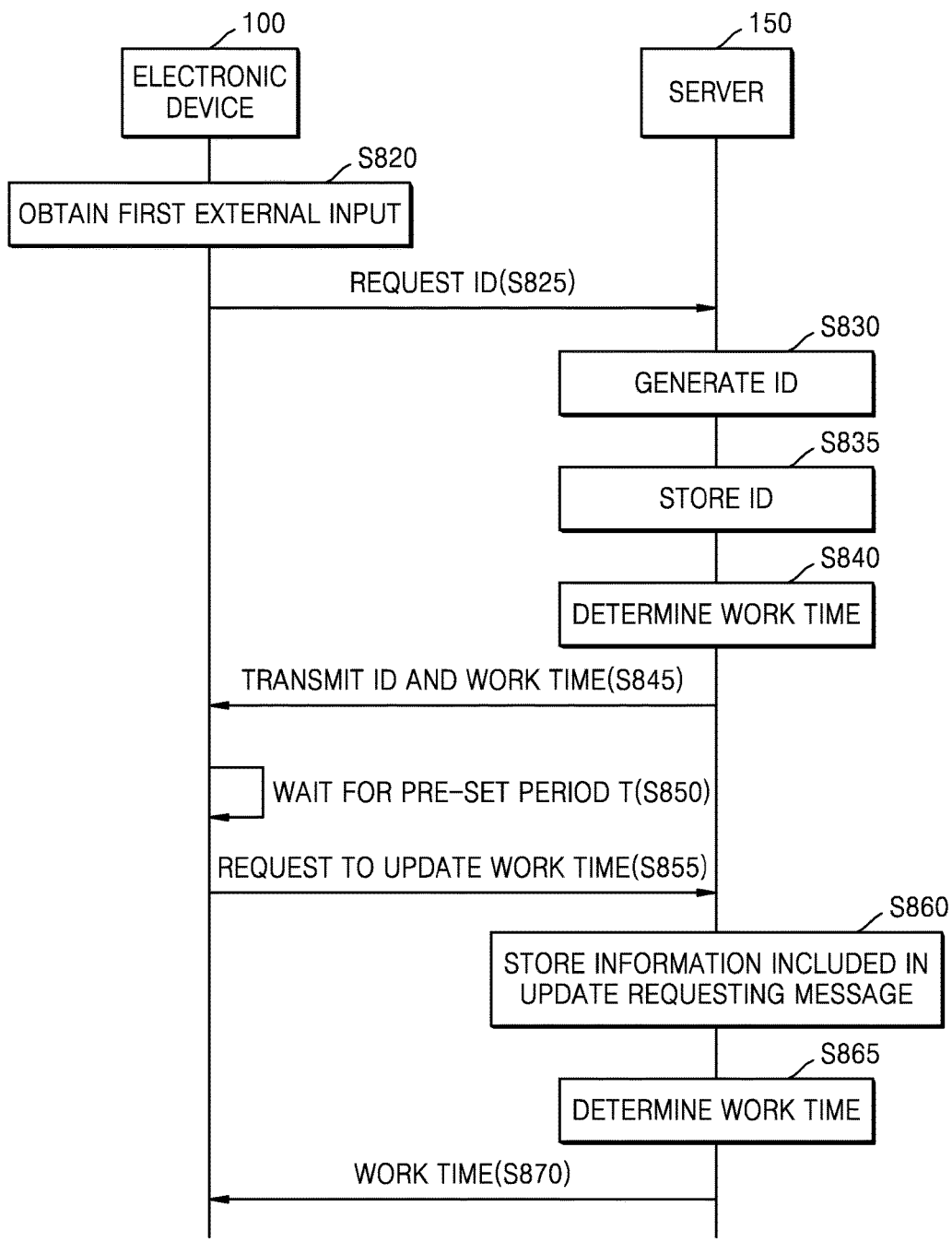
FIG. 8 is a signal flowchart showing a method by which the electronic device and the server determine a work time regarding an application being executed on the electronic device in conjunction with each other, according to an embodiment of the present disclosure.

FIG. 8 is a signal flowchart of a method used by the electronic device 100 and the server 150 determine a work time of an application being executed on the electronic device 100 in conjunction with each other, according to an embodiment of the present disclosure.

Referring to FIG. 8, in operation S820, the electronic device 100 may obtain a first external input. The electronic device 100 may update the mode of an application, which is the target of the first external input, to a work mode based on the first external input.

In operation S825, the electronic device 100 may transmit a message requesting ID of an application updated to a work mode to the server 150. An ID requesting message may include information indicating a time point at which a first external input is obtained, information indicating a time point at which mode of the application, which is the target of the first external input, is updated to a work mode, or information indicating a time point at which the ID requesting message is transmitted to the server 150.

In operation S830, as the ID requesting message is received from the electronic device 100, the server 150 may generate ID of the application updated to the work mode.

In operation S835, the server 150 may store the generated ID in the memory 170. The server 150 may combined the generated ID with the information indicating the time point at which the first external input is obtained, the information indicating the time point at which the mode of the application, which is the target of the first external input, is updated to the work mode, or information indicating the time point at which the electronic device 100 transmitted the ID requesting message to the server 150 that are included in the ID requesting message received from the electronic device 100 and store the combined information in the memory 170.

The server 150 may combine the generated ID with information indicating a time point at which the ID requesting message is received from the electronic device 100 and store the combined information in the memory 170. The server 150 may combine the generated ID with information indicating a time point at which the generated ID is stored in the memory 170 and store the combined information in the memory 170.

In operation S840, the server 150 may determine a work time regarding the application having allocated thereto the ID by using a processor.

The server 150 may determine the initial work time regarding the application having allocated thereto the ID as 0. The server 150 may determine a work time regarding the application having allocated thereto the ID based on at least one of information indicating the time point at which the first external input regarding the application having allocated thereto the ID is obtained or information indicating the time point at which the mode of the application having allocated thereto the ID is updated to the work mode stored in the memory 170.

The server 150 may determine a time period from any one of the time point at which the first external input regarding the application having allocated thereto the ID is obtained or information indicating the time point at which the mode of the application having allocated thereto the ID is updated to the work mode to the time point at which the electronic device 100 transmitted the ID requesting message to the server 150 as the initial work time.

The server 150 may determine a time period from any one of the time point at which the first external input regarding the application having allocated thereto the ID is obtained or information indicating the time point at which the mode of the application having allocated thereto the ID is updated to the work mode to the time point at which the server 150 received the ID requesting message from the electronic device 100 as the initial work time.

The server 150 may determine a time period from any one of the time point at which the first external input regarding the application having allocated thereto the ID is obtained or information indicating the time point at which the mode of the application having allocated thereto the ID is updated to the work mode to the time point at which the ID is stored in the memory 170 as the initial work time.

In operation S845, the server 150 may transmit the generated ID and the determined work time to the electronic device 100.

In operation S850, the electronic device 100 may wait in order to transmit a message to the server 150 from a time point at which the ID is received from the server 150 during a pre-set period T. The pre-set period T may be a period at which the electronic device 100 transmits a message to the server 150. The pre-set period T may be a period at which the electronic device 100 transmits a heartbeat message to the server 150.

In operation S850, during the pre-set period T, the electronic device 100 may obtain a second external input (not shown) regarding the application having allocated thereto the ID.

In operation S855, when the pre-set period T is elapsed after the time point at which the ID is received from the server 150, the electronic device 100 may transmit a work time update requesting message including the ID received from the server 150 to the server 150.

A work time update requesting message may include ID of an application, information indicating a time point at which a second external input regarding the application having allocated thereto the ID is obtained, and information indicating a time point at which the work time update requesting message is transmitted to the server 150.

In operation S860, as the server 150 receives the work time update requesting message from the electronic device 100, the server 150 may store information included in the work time update requesting message in the memory 170.

The server 150 may combine ID of an application included in the work time update requesting message with information indicating a time point at which a second external input regarding the application having allocated thereto the ID is obtained or information indicating a time point at which the work time update requesting message is transmitted to the server 150 and store the combined information in the memory 170.

The server 150 may combine ID of an application included in the work time update requesting message with information indicating a time point at which the work time update requesting message is received from the electronic device 100 and store the combined information in the memory 170. The memory 170 may combine ID of an application included in the work time update requesting message with information indicating a time point at which the work time update requesting message is stored in the memory 170 and store the combined information in the memory 170.

In operation S865, the server 150 may determine a work time regarding the application having allocated thereto the ID included in the work time update requesting message.

The server 150 may determine a time period from any one of a time point at which a first external input regarding the application having allocated thereto the ID and a time point at which mode of the application having allocated thereto the ID is updated to a work mode to a time point at which a second external input regarding the application having allocated thereto the ID is obtained.

The server 150 may determine a time period from any one of a time point at which a first external input regarding the application having allocated thereto the ID, a time point at which mode of the application having allocated thereto the ID is updated to a work mode, and a time point at which the electronic device 100 transmitted an ID requesting message to the server 150 to a time point at which the electronic device 100 transmitted a work time update requesting message to the server 150 as a work time.

The server 150 may determine a time period from any one of a time point at which a first external input regarding the application having allocated thereto the ID, a time point at which mode of the application having allocated thereto the ID is updated to a work mode, and a time point at which the server 150 received an ID requesting message from the electronic device 100 to a time point at which the server 150 received a work time update requesting message from the electronic device 100 as a work time.

The server 150 may determine a time period from any one of a time point at which a first external input regarding the application having allocated thereto the ID, a time point at which mode of the application having allocated thereto the ID is updated to a work mode, and a time point at which the server 150 stored a generated ID in the memory 170 as an ID requesting message is received to a time point at which the server 150 stored information included in a work time update requesting message in the memory 170 as a work time.

In operation S870, the electronic device 100 may receive the work time regarding the application having allocated thereto the ID from the server 150.

Operations S855 through S870 may be repeated while a mode of the application having allocated thereto the ID is a work mode.

Figure 9:
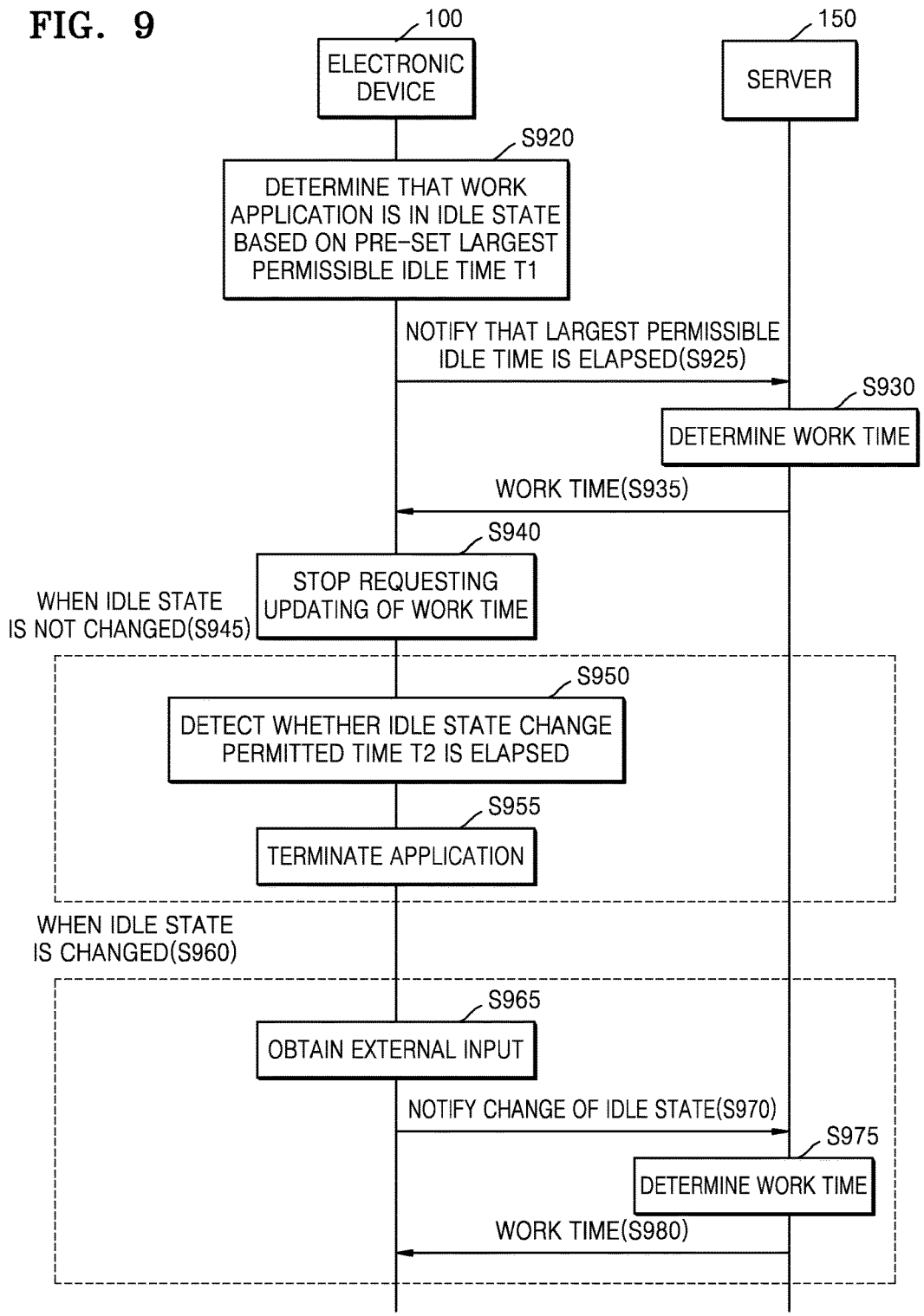
FIG. 9 is a signal flowchart showing a method by which the electronic device and the server handle an idle state in conjunction with each other, according to an embodiment of the present disclosure.

FIG. 9 is a signal flowchart of a method used by the electronic device 100 and the server 150 handle an idle state in conjunction with each other, according to an embodiment of the present disclosure.

Referring to FIG. 9, the signal flowchart shown in FIG. 9 is for describing a process performed as the electronic device 100 detects an idle state of an application having allocated thereto an ID after operations S820 through S870 shown in FIG. 8 are performed.

In operation S920, the electronic device 100 may determine that an application having allocated thereto an ID is in idle state based on a pre-set largest permissible idle time T1.

An idle state may be a state in which no external input regarding an application having allocated thereto an ID in a work mode is detected during the pre-set largest permissible idle time T1.

In operation S925, the electronic device 100 may transmit a message notifying that the largest permissible idle time T1 is elapsed to the server 150.

The message notifying that the largest permissible idle time T1 elapsed may include the ID of the application in an idle state. The message notifying that the largest permissible idle time T1 is elapsed may include the largest permissible idle time T1. The message notifying that the largest permissible idle time T1 elapsed may include information indicating a time point at which the last external input regarding the application in idle state is received. The message notifying that the largest permissible idle time T1 is elapsed may include information indicating a time point at which the electronic device 100 transmitted the message notifying that the largest permissible idle time T1 is elapsed to the server 150.

In operation S930, as the server 150 receives the message notifying that the largest permissible idle time T1 elapsed, the server 150 may determine a work time regarding the application having allocated thereto the ID.

The server 150 may determine that no work is performed during the largest permissible idle time T1 from the time point at which the last external input regarding the application having allocated thereto the ID is received. The server 150 may determine a time period from any one of a time point at which the initial external input regarding the application having allocated thereto the ID is obtained and a time point at which mode of the application having allocated thereto the ID is updated to a work mode to the time point at which the last external input regarding the application having allocated thereto the ID is obtained as a work time.

In operation S935, the server 150 may transmit the determined work time to the electronic device 100.

In operation S940, the electronic device 100 may stop requesting a work time to the server 150.

When the idle state is not changed (operation S945), the method proceeds to operation S950 and operation S955.

In operation S950, the electronic device 100 may detect that an idle state change permitted time T2 elapsed. The idle state change permitted time T2 refers to a largest permissible time for changing an idle state by obtaining an external input regarding the application having allocated thereto the ID from a time point at which the largest permissible idle time T1 elapsed from a time point at which the last external input regarding the application having allocated thereto the ID is obtained.

In operation S955, the electronic device 100 may terminate the application having allocated thereto the ID being executed on the electronic device 100. The electronic device 100 may terminate all of a plurality of application that share a session with the application having allocated thereto the ID being executed on the electronic device 100.

When idle state is changed (operation S960), the method proceeds to operations S965 through S980.

In operation S965, the electronic device 100 may obtain an external input regarding the application in the work mode during the idle state change permitted time T2.

In operation S970, the electronic device 100 may transmit a message notifying change of idle state to the server 150. The message notifying change of idle state may include the ID of the application and information indicating a time point at which the external input that changed idle state is obtained or information indicating a time point at which the electronic device 100 transmitted the message notifying change of idle state to the server 150.

In operation S975, as the server 150 receives the message notifying change of idle state from the electronic device 100, the server 150 may determine a work time of the application having allocated thereto the ID.

The server 150 may determine a time period from any one of a time point at which the initial external input regarding the application having allocated thereto the ID is obtained and a time point at which the mode of the application having allocated thereto the ID is updated from a non-work mode to a work mode to a time point at which the external input that changed idle state is received as a work time.

The server 150 may determine a time period from any one of a time point at which the initial external input regarding the application having allocated thereto the ID is obtained and a time point at which the mode of the application having allocated thereto the ID is updated from a non-work mode to a work mode to a time point at which the electronic device 100 transmitted the message notifying change of idle state to the server 150 as a work time.

In operation S980, the server 150 may transmit the determined work time to the electronic device 100.

Figure 10:
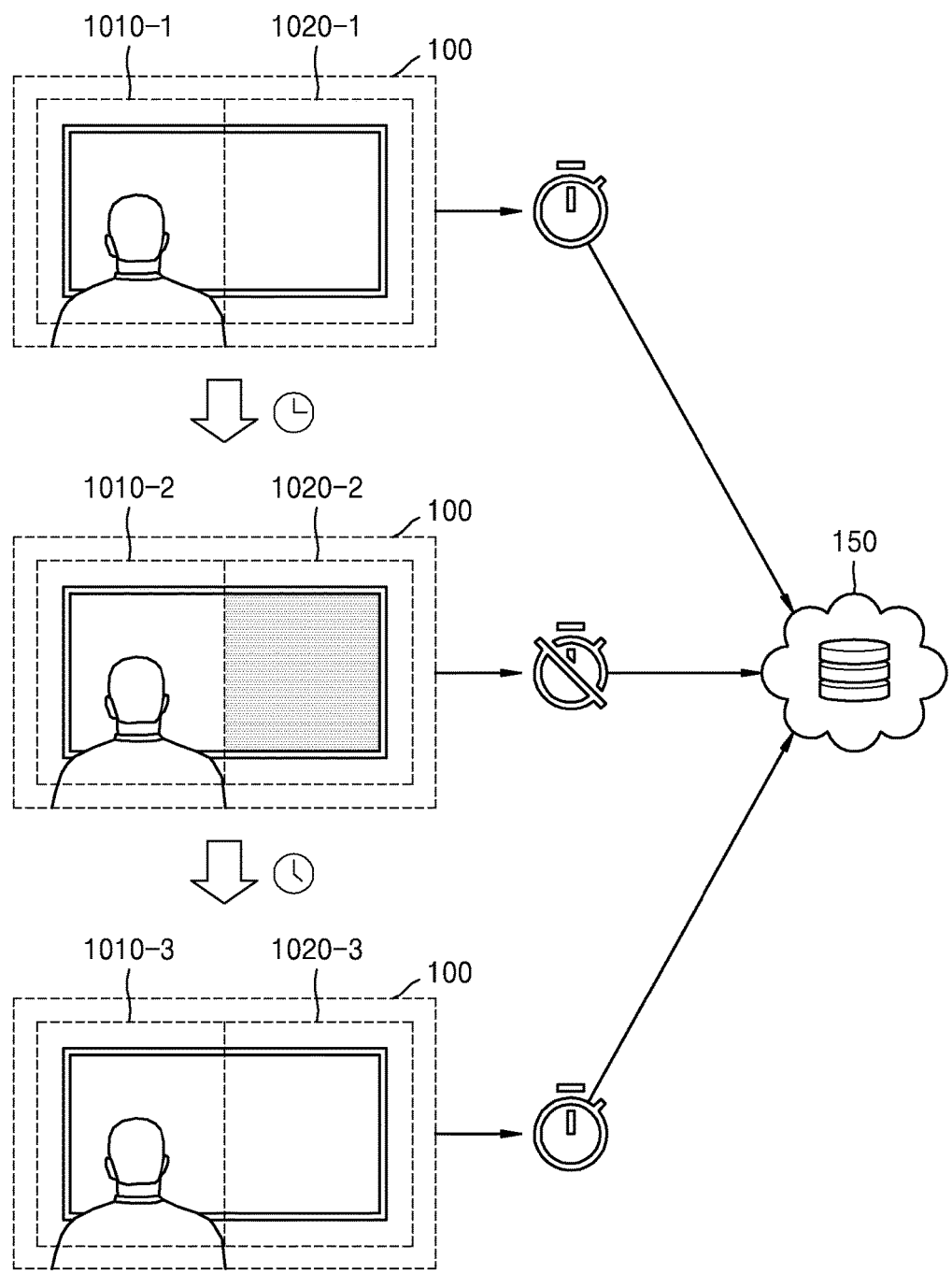
FIG. 10 is a diagram showing an example that opacity of an area for displaying an application is changed as state of the application is changed from normal state to idle state according to an embodiment of the present disclosure.

FIG. 10 is a diagram showing an example that opacity of an area for displaying an application is changed as state of the application is changed from normal state to idle state according to an embodiment of the present disclosure.

Referring to FIG. 10, the electronic device 100 may display an application on a screen. As shown in FIG. 10, the screen of the electronic device 100 may include areas 1010-1, 1010-2, and 1010-3 in which no application is displayed and areas 1020-1, 1020-2, and 1020-3 in which an application is displayed.

Opacity of area 1010-2 in which no application is displayed in the idle state may not be different from opacity of the area 1010-1 in which no application is displayed in normal state. However, compared to opacity of the area 1020-1 in which an application is displayed in a normal state, opacity of the area 1020-2 in which an application is displayed in the idle state may increase.

Furthermore, when the idle state is changed to the normal state, opacity of the area 1010-2 in which no application is displayed in the idle state may not be different from opacity of the area 1010-2 in which no application is displayed. On the contrary, when the idle state is changed to the normal state, compared to opacity of the area 1020-2 in which an application is displayed in the idle state, opacity of the area 1020-3 in which an application is displayed may decrease and return to the opacity of the area 1020-1 in which an application is displayed in the normal state.

Although FIG. 10 shows an example in which opacity of an area in which an application is displayed is changed non-continuously, opacity may also be changed continuously as time passes.

Figure 11:
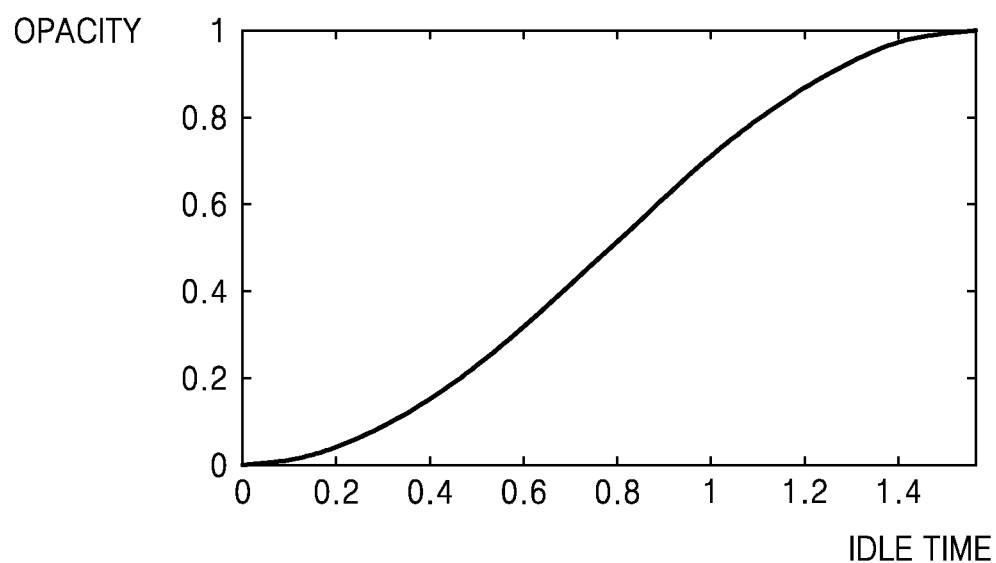
FIG. 11 is a graph showing a relationship between an idle time and an opacity of an area of a display in which an application is displayed, according to an embodiment of the present disclosure.

FIG. 11 is a graph showing a relationship between an idle time and opacity of an area of a display in which an application is displayed, according to an embodiment of the present disclosure.

Referring to FIG. 11, the horizontal axis of the graph may indicate the idle time. As described above, the idle time may refer to a time elapsed from a time point at which the electronic device 100 obtains the last external input regarding an application. However, the inventive concept is not limited thereto.

Furthermore, the vertical axis of the graph may indicate opacity of an area of a display in which an application is displayed. The lowest value of the opacity is 0, and the highest value of the opacity may be 1. For example, at the lowest opacity, an application may be displayed as-is. Furthermore, for example, at the highest opacity, an application may not be displayed at all. However, the inventive concept is not limited thereto.

Opacity may be a monotone increasing function with respect to the idle time. For example, the opacity may increase geometrically with the idle time. Furthermore, for example, the opacity with respect to the idle time may non-continuously increase from the lowest value, which is 0, to the highest value, which is 1, at a particular time point. However, the inventive concept is not limited thereto.

Furthermore, the opacity may have the lowest value at the beginning of the idle time and may have the highest value when the idle time is the largest possible.

Figure 12:
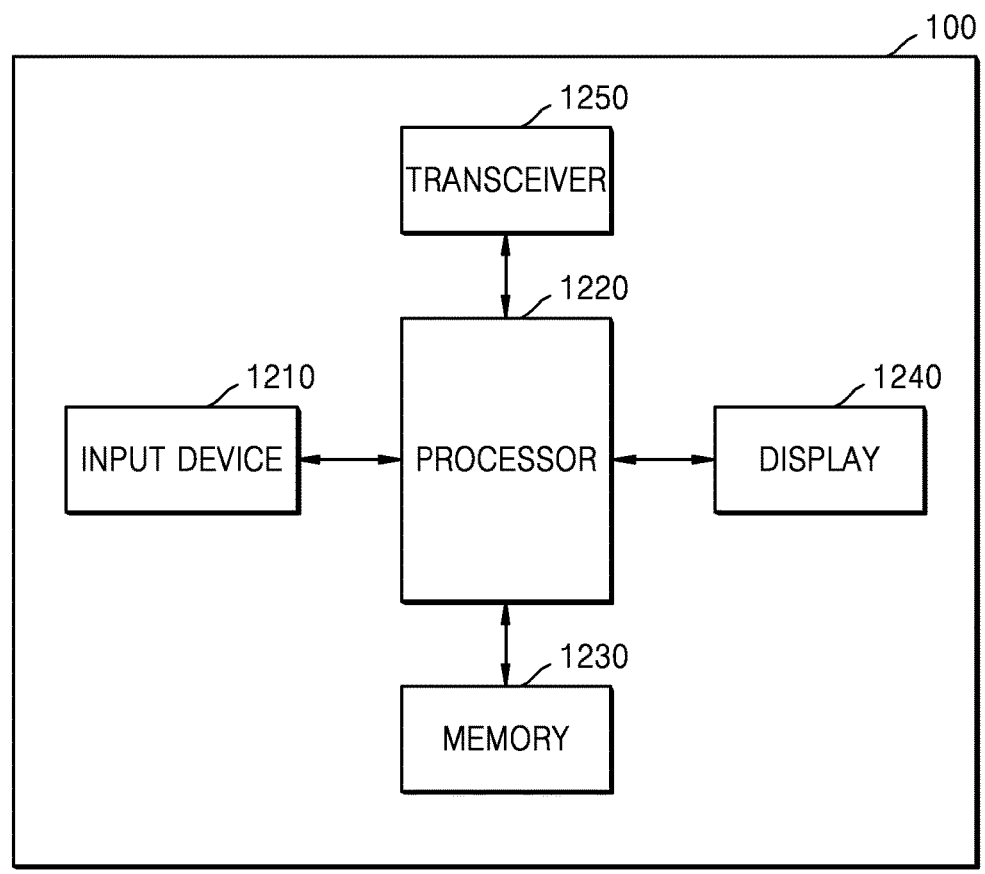
FIG. 12 is a block diagram showing the structure of the electronic device according to an embodiment of the present disclosure.

FIG. 12 is a block diagram showing the structure of the electronic device 100 according to an embodiment of the present disclosure. As described above with reference to FIGS. 1, 2, 3, 4, 5, 6, 7, 8, 9, 10, and 11, the electronic device 100 may determine a work time of an application. Furthermore, the electronic device 100 shown in FIG. 12 may be implemented all of the embodiments for determining a work time as described above with reference to FIGS. 1, 2, 3, 4, 5, 6, 7, 8, 9, 10, and 11.

Referring to FIG. 12, the electronic device 100 may include an input device 1210, a processor 1220, a memory 1230, a transceiver 1250, and a display 1240. The input device 1210, the processor 1220, the memory 1230, the transceiver 1250, and the display 1240 may be electrically connected to one another via a bus or the like. The electronic device 100 shown in FIG. 12 includes only components related to the present embodiment. Therefore, one of ordinary skill in the art will understand that the electronic device 100 may further include general-purpose components other than the components shown in FIG. 12.

The detailed descriptions of the above-stated components will be given below.

The input device 1210 is a device by which a user inputs data for controlling the electronic device 100. The input device 1210 may include various input device for operating the electronic device 100 based on an external input, such as a keyboard, a mouse, a touch pad (a capacitive overlay type, a resistive overlay type, an infrared beam type, an integral strain gauge type, a surface acoustic wave type, a piezoelectric type, etc.), and a key button, but is not limited thereto.

Furthermore, the electronic device 100 may obtain an external input for updating a mode of an application to a work mode or a non-work mode, such as an input for executing the application or an input for clicking a certain area corresponding to the application, via the input device 1210.

The processor 1220 may include one or more processors, such as a CPU and a GPU, but is not limited thereto.

The processor 1220 may update a mode of at least one application from among a plurality of applications being executed on the electronic device 100 from a non-work mode to a work mode based on a first external input regarding the at least one application obtained via the input device 1210.

Furthermore, as a first external input is obtained via the input device 1210, the processor 1220 may determine at least one application, which is the target of the first external input.

Furthermore, as a first external input is obtained via the input device 1210, the processor 1220 may determine a mode of at least one application, which is the target of the first external input. The mode of the at least one application may be a work mode or a non-work mode. In FIG. 12, when a first external input is obtained, the processor 1220 may determine a mode of at least one application, which is the target of the first external input, is a non-work mode.

Furthermore, when a first external input is obtained via the input device 1210, as a mode of at least one application, which is the target of the first external input, is determined, the processor 1220 may update the mode of the at least one application to a work mode or may maintain the work mode of the at least one application. When the first external input is obtained and it is determined that the mode of the at least one application, which is the target of the first external input, is a non-work mode, the processor 1220 may update the mode of the at least one application to the work mode.

Furthermore, when the first external input is obtained and it is determined that the mode of the at least one application, which is the target of the first external input, is the work mode, the processor 1220 may maintain the work mode of the at least one application.

For example, when the first external input is obtained via the input device 1210 and it is determined that the mode of the at least one application, which is the target of the first external input, is the non-work mode, the processor 1220 may update the mode of the at least one application to the work mode.

The processor 1220 may update a mode of another application other than at least one application, which is the target of the first external input, from among a plurality of applications from a work mode to a non-work mode, based on an external input obtained via the input device 1210.

When the first external input is obtained, the processor 1220 may determine whether the mode of the other application other than the at least one application, which is the target of the first external input, is the work mode or the non-work mode. For example, when the first external input is obtained, the processor 1220 may determine that the mode of the other application other than the at least one application, which is the target of the first external input, is the work mode.

Furthermore, when the first external input is obtained via the input device 1210 and the mode of the other application other than the at least one application, which is the target of the first external input, the processor 1220 may update the mode of the other application to the non-work mode or maintain the non-work mode of the at least one application.

When the first external input is obtained and it is determined that the mode of the other application is the work mode, the processor 1220 may update the mode of the other application to the non-work mode.

Furthermore, when the first external input is obtained and it is determined that the mode of the other application is the non-work mode, the processor 1220 may maintain the non-work mode of the other application. For example, when the first external input is obtained and it is determined that the mode of the other application is the non-work mode, the processor 1220 may update the mode of the other application to the non-work mode.

The processor 1220 may determine a work time of the at least one application, which is the target of the first external input, based on information indicating a time point at which the first external input is obtained and information indicating a time point at which mode of the application, which is the target of the first external input, is updated to the work mode.

Furthermore, the processor 1220 may determine a time period from the time point at which the first external input is obtained to a time point at which a work time is determined as a work time of the at least one application, which is the target of the first external input. Furthermore, the processor 1220 may determine a time period from the time point at which the mode of the at least one application, which is the target of the first external input, is updated from the non-work mode to the work mode to a time point at which a work time is determined as a work time of the at least one application, which is the target of the first external input.

Furthermore, the processor 1220 may determine a time period from the time point at which the first external input is obtained to a time point at which another external input regarding the at least one application, which is the target of the first external input, is obtained as a work time of the at least one application.

Furthermore, the processor 1220 may determine a time period from the time point at which the mode of the application, which is the target of the first external input, is updated to the work mode to a time point at which another external input regarding the at least one application, which is the target of the first external input, is obtained as a work time of the at least one application. The processor 1220 may determine a sum of the work time of the at least one application, which is the target of the first external input, and a previous work time as a work time of a plurality of application executed on the electronic device 100.

The memory 1230 may store at least one of information indicating a time point at which the first external input is obtained and information indicating a time point at which a mode of the application, which is the target of the first external input, is updated to the work mode. For example, the memory 1230 may store at least one of a time stamp indicating a time point at which the first external input is obtained and a time stamp indicating a time point at which a mode of the application, which is the target of the first external input, is updated to the work mode.

As described above, a time stamp may include visual information displayed at a particular location in order to prove existence of data at a certain time point.

The memory 1230 may include a non-volatile storage medium for storing digital data, such as a hard disk drive (HDD) or a flash memory.

The display 1240 may include a device for visually displaying a screen image, such as a liquid crystal display (LCD) module or a light emitting diode (LED) module. The display 1240 may display a work time regarding at least one application. The display 1240 may display work times regarding a plurality of applications.

The transceiver 1250 may include a network interface card (NIC) or a modem. The electronic device 100 may exchange certain data with an external electronic device or the server 150 via the transceiver 1250.

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may also refer to a combination of processing devices, e.g., a combination of a DSP and a microprocessor, a plurality of microprocessors, one or more microprocessors in conjunction with a DSP core, or any other such configuration.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may be transmitted via a transmission medium. For example, when software is transmitted from a website, a server, or any of various other remote sources via by using a coaxial cable, an optical fiber cable, a twisted pair, a digital subscriber line, or a wireless medium, such as an infrared ray, a radio wave, or a microwave, the coaxial cable, the optical fiber cable, the twisted pair, the digital subscriber line, and the wireless medium, such as an infrared ray, a radio wave, or a microwave, are included in the scope of the transmission medium.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method of managing a plurality of applications executed on an electronic device, the method comprising:
based on a first external input regarding at least one application from among the plurality of applications, updating a mode of the at least one application from a non-work mode to a work mode;
transmitting, to a server, a message including at least one of information indicating a time point at which the first external input is obtained or information indicating a time point at which the mode of the at least one application is updated from the non-work mode to the work mode;
receiving, from the server, a work time of the at least one application that is determined based on the at least one of the information which is included in the message,
determining a sum of the work time received from the server and a previous work time of the at least one application; and
displaying the determined sum,
wherein the updating of the mode of the at least one application to the work mode comprises activating a counter allocated to the at least one application from among one or more counters that are respectively allocated to the plurality of applications and trigger message transmission to the server, and
wherein, in the transmitting to the server the message, the message is transmitted to the server as the one or more counters are activated.

2. The method of claim 1, wherein the displaying of the determined sum comprises displaying a work time of the at least one application that is determined as a time period from at least one of the time point at which the first external input is obtained or the time point at which the mode of the at least one application is updated to the work mode, to a time point at which the work time is determined.

3. The method of claim 1, wherein the displaying of the determined sum comprises, when a second external input regarding the at least one application updated to the work mode is obtained, displaying a work time of the at least one application that is determined as a time period from the time point at which the first external input is obtained to a time point at which the second external input is obtained.

4. The method of claim 1, wherein the displaying of the determined sum comprises, when no external input other than the first external input is obtained within a pre-set time period from the time point at which the first external input is obtained, displaying a work time of the at least one application that is determined by subtracting the pre-set time period from a time period from the time point at which the first external input is obtained to a time point at which the work time is determined.

5. A non-transitory computer readable recording medium having recorded thereon a computer program, which when executed by at least one processor, causes the at least one processor to control to implement the method of claim 1.

6. An electronic device that executes a plurality of applications, the electronic device comprising:
at least one processor configured to:
based on a first external input regarding at least one application from among the plurality of applications, update a mode of the at least one application from a non-work mode to a work mode,
transmit, to a server, a message including at least one of information indicating a time point at which the first external input is obtained or information indicating a time point at which the mode of the at least one application is updated from the non-work mode to the work mode,
receive, from the server, a work time regarding the at least one application that is determined based on the at least one of the information which is included in the message, and
determine a sum a of the work time received from the server and a previous work time of the at least one application;
a display configured to display the determined sum,
wherein the at least one processor is configured to update the mode of the at least one application to the work mode by activating a counter allocated to the at least one application from among one or more counters that are respectively allocated to the plurality of applications and trigger message transmission to the server, and wherein a transceiver is configured to transmit to the server the message as the one or more counters are activated.

7. The electronic device of claim 6, wherein the display is further configured to display a work time of the at least one application that is determined as a time period from; at least one of the time point at which the first external input is obtained or the time point at which the mode of the at least one application is updated to the work mode, to a time point at which the work time is determined.

* * * * *